United States Patent [19]
Velamuri et al.

[11] Patent Number: 6,154,535
[45] Date of Patent: Nov. 28, 2000

[54] METHODS AND SYSTEM FOR OBTAINING PROCESSING INFORMATION RELATING TO A COMMUNICATION

[75] Inventors: Syama S. Velamuri, Duluth; Julia B. Torbert, Stone Mountain, both of Ga.

[73] Assignee: Bellsouth Corporation, Atlanta, Ga.

[21] Appl. No.: 09/079,979

[22] Filed: May 15, 1998

[51] Int. Cl.$^7$ ........................................................ H04M 3/42
[52] U.S. Cl. ........................... 379/210; 379/201; 379/221; 379/230
[58] Field of Search .................................. 379/210, 211, 379/201, 207, 219, 220, 221, 229, 230, 242, 112, 115; 702/150

[56] References Cited

U.S. PATENT DOCUMENTS

| | | | |
|---|---|---|---|
| 3,556,530 | 1/1971 | Barr et al. | 379/90.01 |
| 3,614,328 | 10/1971 | McNaughton et al. | 370/270 |
| 3,928,724 | 12/1975 | Byram et al. | 704/275 |
| 4,139,739 | 2/1979 | von Meister et al. | 379/384 |
| 4,164,025 | 8/1979 | Dubnowski et al. | 379/213 |
| 4,178,476 | 12/1979 | Frost | 340/825.44 |
| 4,191,860 | 3/1980 | Weber | 379/115 |
| 4,310,727 | 1/1982 | Lawser | 379/207 |
| 4,313,035 | 1/1982 | Jordan et al. | 379/207 |
| 4,341,929 | 7/1982 | Alexander et al. | 379/359 |
| 4,577,062 | 3/1986 | Hilleary et al. | 379/88.21 |
| 4,608,460 | 8/1986 | Carter et al. | 379/71 |
| 4,737,983 | 4/1988 | Frauenthal et al. | 379/221 |
| 4,757,267 | 7/1988 | Riskin | 379/113 |
| 4,797,818 | 1/1989 | Cotter | 705/15 |
| 4,924,510 | 5/1990 | Le | 379/221 |
| 5,046,088 | 9/1991 | Margulies | 379/211 |
| 5,095,505 | 3/1992 | Finucane et al. | 379/201 |
| 5,136,636 | 8/1992 | Wegrzynowicz | 379/207 |
| 5,168,515 | 12/1992 | Gechter et al. | 379/265 |
| 5,214,688 | 5/1993 | Szlam et al. | 379/88.22 |
| 5,253,288 | 10/1993 | Frey et al. | 379/221 |
| 5,259,023 | 11/1993 | Katz | 379/88.09 |
| 5,430,719 | 7/1995 | Weisser, Jr. | 370/389 |
| 5,506,897 | 4/1996 | Moore et al. | 379/220 |
| 5,533,107 | 7/1996 | Irwin et al. | 379/201 |
| 5,848,131 | 12/1998 | Shaffer et al. | 379/88.2 |
| 5,859,901 | 1/1999 | Brendzel et al. | 379/114 |
| 5,961,572 | 10/1999 | Craport et al. | 701/207 |
| 5,978,747 | 11/1999 | Craport et al. | 702/150 |
| 5,991,739 | 11/1999 | Cupps et al. | 705/26 |
| 6,064,887 | 5/2000 | Kallioniemi et al. | 455/445 |

*Primary Examiner*—Krista Zele
*Assistant Examiner*—Benny Q. Tieu
*Attorney, Agent, or Firm*—Kilpatrick Stockton LLP

[57] ABSTRACT

Methods and systems for obtaining information based on a calling number associated with a communication from a subscriber area defined within the service area. A grid/block/strip system defines at least one strip within a subscriber area and within a block. A strip table includes a strip entry for each strip and each strip entry includes strip entry information. In response to receipt of a communication including a calling number representing a point within the service area, a key is created. The key identifies a particular block encompassing the point. The key is used with the strip table to find a strip entry that corresponds to a strip encompassing the point. The encompassing strip is found by using the key to check only strip entries corresponding to the particular block, and in some embodiments, to check only the strip entry keys of a strip entry corresponding to the particular block. Further, the encompassing strip is found by using and changing the key as necessary to check the particular strip entries to determine whether the point is located in an N-strip of the particular block, an N/2-strip, an N/4 strip, etc. Based on finding the encompassing strip, information relating to the communication may be obtained from the encompassing strip entry information.

Prior to obtaining the information relating to the communication from the encompassing strip entry information, a comparison may be made between the offset of the point and the min offset and the max offset of the encompassing strip entry information. If the offset of the point is between the min offset and the max offset, it may be confirmed that the strip corresponds to the encompassing strip. Then, information relating to the communication may be obtained from the encompassing strip entry information.

7 Claims, 11 Drawing Sheets

STRIP TABLE OF STRIP ENTRIES _40_

| _62_ STRIP | STRIP ENTRY KEYS (SEKs) _44_ | | | | STRIP ENTRY INFO _46_ | | |
|---|---|---|---|---|---|---|---|
| | _48_ SEK BLOCK ID | SEK OFFSET _50_ | _52_ SEK SEQ. NO. | _54_ SEK SIZE IND. | _56_ XMIN OFFSET* | _58_ XMAX OFFSET* | _60_ SECTION ID |
| A | 01,10 | 11 | 01,10 | 0011 | 01 0000000 | 10 1111111 | QQQ |
| B | 01,11 | 00 | 01,11 | 0010 | 00 1100000 | 10 1111111 | HHH |
| C | 01,11 | 10 | 01,11 | 0011 | 00 0000000 | 01 1111111 | TTT |
| D | 01,11 | 01 | 01,11 | 0011 | 00 0000000 | 00 1100000 | BBB |
| E | 01,10 | 00 | 01,10 | 0011 | 01 0000000 | 10 1111111 | JJJ |

*USING 9 BIT REPRESENTATION 42a, 42b, 42c, 42d, 42e

FIG.3

(optional)

METHODS AND SYSTEM FOR OBTAINING PROCESSING INFORMATION RELATING TO A COMMUNICATION

FIELD OF THE INVENTION

The present invention relates to methods and systems for obtaining information relating to communication processing. In particular, the present invention relates to methods and systems for obtaining such information based on a calling number associated with the communication and based on a subscriber area associated with a subscriber to whom the communication is directed. Even more particularly, the present invention relates to methods and systems for obtaining such information in an expedient manner with minimal queries for such information.

BACKGROUND

Quick, quicker and quickest. These adjectives characterize the speed of communication processing that is desired and often demanded by subscribers with respect to telecommunication services from service providers. Thus, efforts by service providers are continually underway to expedite all stages of call processing for the benefit of subscribers and ultimately the benefit of the service providers as well.

One stage of call processing that is a focus of effort is information retrieval. Expediting information retrieval is especially desired with respect to telecommunication services that generally require a database search for information before a particular communication may be further routed. Expediting information retrieval in theses cases is especially desired because the particular communication is essentially on hold until the information is retrieved or other steps are taken with respect to routing the call. A communication on hold may translate to an unhappy caller or subscriber. A communication on hold may take up valuable network resources. Thus, efforts are underway to expedite information retrieval so that a minimum amount of time is spent on hold by any particular communication.

A type of telecommunications service that generally requires a database search with respect to call routing is an area number service. Such area number services are offered by various service providers under various service marks such as the ZipCONNECT® service from BellSouth Corporation. A subscriber who subscribes to an area number service is provided with a single directory number to distribute to customers, to advertise, etc. Upon receipt of a communication directed to this directory number, the area number service determines the location of the caller based on the calling number. Then, the area number service retrieves information from a database with respect to the further routing of the communication. This information, as provided by the subscriber, may specify that calls from the location or area of the caller are to be routed for connection or termination to a particular subscriber location. The area number service generally follows up on the retrieved information by routing the communication to the particular subscriber location. Further details regarding an exemplary area number service are provided in the commonly assigned patent, U.S. Pat. No. 5,533,107, entitled Method for Routing Calls Based on Predetermined Assignments of Callers Geographic Locations and incorporated herein by reference.

An area number service is particularly useful to a subscriber that has two or more locations, but that desires to distribute or advertise only a single directory number. For example, a burger business with three different locations (A, B & C) may advertise a single directory number such as BUR-GERR. Calls from a first area may be routed to location A based on the information retrieved by the area number service; calls from a second area may be routed to location B based on the information retrieved by the area number service; and calls from a third area may be routed to location C based on the information retrieved by the area number service.

The example of the burger business also may be used to demonstrate the reason for the interest in expediting the call processing stage of information retrieval with respect to the routing of calls such as a call dialed to BUR-GERR. A hungry caller salivating for a burger dials BUR-GERR and is essentially put on hold by the area number service until information is retrieved with respect to the further routing of the communication. The longer it takes to retrieve the information, the longer the caller is denied his or her burger, and the less likely it is that the caller will make another call for a burger to BUR-GERR. The diminishment of the likelihood that the caller will call for a burger from BUR-GERR makes the burger business unhappy, and in particular, makes the burger business unhappy with its area number service provider. Thus, the service provider is very interested in expediting call processing and in expediting the call processing stage of information retrieval.

Generally, information retrieval in an area number service has been accomplished through the use of two queries to real-time databases with respect to each communication. Two queries typically have been necessary because of the large amounts of data involved. For ease of reference, we refer to such an information retrieval system as a "two query system". Per this two query system, upon receipt of the communication to the subscriber's directory number, a first query is made to a real-time database for caller location information based on the calling number of the communication. Then, a second query is made to another (or in some cases the same) real-time database for call processing information based on the caller location information. In other words, the first query results in the translation of the calling number into a location and the second query retrieves call processing information based on the location ascribed to the calling number. Thus, a disadvantage of this two query system is that call processing is delayed while each of the queries to the real-time databases is carried out.

As noted, the two query system makes use of one or more real-time databases to obtain information necessary to further route a communication. A real-time database is used to store the information relating to a subscriber and the subscriber's designations with respect to the routing of communications directed to the subscriber's directory number. Even with respect to a single subscriber, this information may be a great deal of information. With hundreds and thousands of subscribers in the service area of a service provider, such a large amount of information to be stored may result in the use of multiple real-time databases. Further, each of these real-time databases may have to hold a lot of information and thus, take up a lot of the storage medium holding the database. Thus, another disadvantage of the two query system is that a lot of storage medium in a computer system or network serving an area number service must be devoted to storing the subscriber related information in one or more realtime databases.

Some of the disadvantages of the two-query system used in conjunction with area number services have been enumerated above. But these disadvantages are not limited only to the two-query system, to area number services, or to telecommunications technology. These disadvantages and equivalent disadvantages may be present in any type of call or data processing system that requires the retrieval of information from a database prior to the connection or termination of a communication or throughput of the data. In addition, these disadvantages and equivalent disadvantages may be present in connection with any type of information retrieval system that requires the retrieval of information from a database that contains a large amount of data. Other areas wherein these disadvantages or equivalent disadvantages also may be present will occur to those skilled in the art.

Accordingly, there is a need for a method and system that expedites call processing by expediting the information retrieval stage of call processing.

There is a particular need for a method and system that expedites call processing with respect to telecommunication services that generally require a database search for information before a particular communication may be further routed.

Also, there is a specific need for a method and system that expedites call processing with respect to telecommunication services such as area number services that use the two query system in conjunction with one or more real-time databases.

In addition, there is a further need for a method and system that obviates the necessity of making two queries to obtain call processing information with respect to a communication such as used in the two query system.

There is yet another need for a method and system that reduces the amount of storage medium in a computer system or network that must be devoted to serving an area number service or other service.

SUMMARY

Stated very generally, the present invention provides improved methods and systems for obtaining information in response to a query. An exemplary context for the present invention is in use with a telecommunications service such as an area number service (ANS). In that case, the present invention obtains information based on a calling number associated with the communication, based on a subscriber area defined within the service area served by a service provider, and based on a common treatment ascribed to all communications received from an area corresponding to a particular strip of the subscriber area. Advantageously, the common treatment ascribed to all communications that are received from a particular strip of the subscriber area results in several desirable features. For example, the common treatment allows for the storage of the majority of information needed for an area number service with a relatively few number of entries in the memory allocated to a service package application (SPA) associated with a telecommunications network element such as a service control point (SCP) rather than a real-time database. The inventors explain this storage of information in the memory of the SPA reduces the number of queries that are made to the real-time database for communication routing information in an area number service from two queries to approximately 1.1–1.2 queries, thereby greatly improving call processing time. In other words, in 80–90% of the cases, a second query to a real-time database is unnecessary because the needed information is obtained from the memory associated with the ANS SPA. This explanation is based on the observation that large groupings of data are possible for typical ANS subscribers.

In addition, the present invention provides methods and systems to optimize the search for the desired information in the memory of the SPA such that only a minimal amount of information must be searched in order to obtain the desired information. This optimization occurs preferably through the use of a key which is created based on association of the calling number of the communication to a point identifier. The key is used preferably in a binary/hash search of a strip table for the information that is stored in the strip table on the basis of the common treatment that is ascribed to all communications received from a particular strip of the subscriber area. The preferred methods and systems expedite the processing of the communication so that it may be more quickly routed to its ultimate destination.

Although the context of the present invention is the search for desired information relating to a communication, the principles of the present invention may be applied to other environments that include information arrangement and retrieval.

An exemplary embodiment of the present invention provides a method for obtaining information relating to a communication based on a calling number associated with the communication and based on a subscriber area defined within the service area. This exemplary method provides a grid/block/strip system with respect to the service area by providing a grid representing the service area. The grid includes a plurality of blocks. The grid also defines a subscriber area within the service area. The grid/block/strip system further includes at least one strip defined within the subscriber area and within a block of the plurality of blocks. Further, the grid/block/strip system provides a strip table with a strip entry corresponding respectively to each strip. Each strip entry is associated with strip entry information.

In response to receipt of a communication including a calling number with the calling number representing a point or being mapped to a point within the service area, a key is created. In the case of mapping, in some cases, more than one calling number may be mapped to the same point. The key is created with respect to the point with the key identifying a particular block encompassing the point. After the key is created, steps are taken to find an encompassing strip. The encompassing strip is defined within the particular block that encompasses the point. The encompassing strip has an encompassing strip entry in the strip table. The encompassing strip entry is associated with encompassing strip entry information. The encompassing strip is found by using the key with the strip table to look for the encompassing strip by checking only particular strip entries. These particular strip entries correspond respectively to potentially encompassing strips within the particular block. The key may be used to make a determination that the point is located in a strip that encompasses the particular block in its entirety. If a determination is made that the point is located in a strip that encompasses the particular block, then the strip that encompasses the particular block in its entirety is defined to be the encompassing strip. Based on finding the encompassing strip, information relating to the communication may be obtained from the encompassing strip entry information.

But there may not be a strip that encompasses the particular block. In that case, the key may be further used with the strip table. In particular, the key may be used to find the encompassing strip by making a check of the particular strip entries to determine whether the point is located in an N-strip in the particular block. An N-strip is a strip of size N. If the point is located in an N-strip, then the N-strip is defined in the particular block to be the encompassing strip. Based on finding the encompassing strip, information relating to the communication may be obtained from the encompassing strip entry information.

But the point may not be located in an N-strip. In that case, the key may be used to make a second check. The key may be changed for this second check. This second check is used to determine whether the point is located in an N/2 strip in the particular block. The N/2 strip is a strip of size N/2. If the point is located in an N/2 strip, then the N/2 strip is defined in the particular block to be the encompassing strip. Based on finding the encompassing strip, information relating to the communication may be obtained from the encompassing strip entry information.

If the point is not located in the N/2 strip, then the key may be used in a third check with the strip table. The key may be changed for this third check. This third check is used to determine whether the point is located in an N/4 strip in the particular block. This type of checking may continue with successively smaller strips through several iterations until an encompassing strip is found or until it is determined that the desired information be sought from another source. Advantageously, this exemplary embodiment checks for the encompassing strip through a binary/hash search system. This checking reviews strips on the basis of decreasing size in a particular direction where the size decreases by half each time, to-wit: N; N/2; N/4; etc. In this manner, the most likely strips to encompass the point are checked before other less likely strips.

In this exemplary method, the key may be used with the above described steps to look for the encompassing strip by checking only particular strip entry keys. These particular strip entry keys are associated respectively with the particular strip entries corresponding respectively to the strips within the particular block. Thus, the key is used in comparison to only the particular strip entry keys and therefore in comparison to a smaller amount of information than in a comparison to all of the strip entry keys.

Also in this exemplary method, the encompassing strip entry information may include a min offset and a max offset. This min offset may correspond to a boundary of a strip in a first direction. This max offset may correspond to a boundary of the strip in a direction parallel to the first direction. This min offset and max offset may be used to further determine whether the encompassing strip has been found. Prior to obtaining the information relating to the communication from the encompassing strip entry information, a comparison may be made between the offset of the point and the min offset and the max offset of the encompassing strip entry information. If the offset of the point is between the min offset and the max offset, it may be confirmed that the strip corresponds to the encompassing strip. Then, information relating to the communication may be obtained from the encompassing strip entry information.

Another exemplary method of the present invention also may be used in connection with a telecommunications system serving a service area. This service area includes a subscriber area and has the service area represented by a grid. This grid includes a plurality of blocks with each block including a block identifier. At least one strip is defined within the subscriber area and within a block of the plurality of blocks. The telecommunications system further provides a strip table with a strip entry corresponding respectively to each strip. Each strip entry includes a strip entry key (SEK) that is associated with strip entry information. The SEK includes a SEK block identifier and a SEK size indicator. The strip entry information includes a min offset and a max offset, and may include a Ymin offset and a sequence number.

This exemplary method provides for obtaining information relating to a communication based on a calling number associated with the communication and based on the subscriber area. Upon receipt of a communication including a calling number with the calling number representing a point or being mapped to a point within the service area, a key is created. The key is created with respect to the point wherein the key comprises a point-block identifier and a size indicator. The point-block identifier represents a particular block encompassing the point and including an offset with respect to the point.

In this exemplary method, the key is used with the strip table to determine whether the point is located within a strip defined within the particular block through the use of several sub-steps. In particular, the key is used in a search of a SEK of a strip entry for a matching SEK. In response to finding the matching SEK in the strip table, the offset of the point identifier of the key is compared to the min offset of strip entry information corresponding to the matching SEK and is compared to the max offset of the strip entry information corresponding to the matching SEK. If the offset is determined to be between the min offset and the max offset, the point is determined to be located in a matching strip corresponding to the matching SEK. Then, information relating to the communication may be obtained from the matching strip entry information corresponding to the matching strip.

In this exemplary method, the search may not result in a matching SEK. In that case, the key may be changed so that the size indicator changes from a first size indicator to a second size indicator. With the change in the size indicator, other elements that may be used, such as the Ymin offset, may change as well Then, the key with the second size indicator may be used in the search of the SEK for the matching SEK. Advantageously, the key may be changed by changing the size indicator repeatedly changed until a search indicator results in a matching SEK or until it is determined that the desired information be sought from another source.

Advantageously, these methods and systems expedite the processing of the communication so that it may be more quickly routed to its ultimate destination. These methods and systems also minimize data storage requirements on the basis that the common, most often requested information may be consolidated in a service package application (SPA) memory rather than a real-time or other database. These methods and systems also optimize the search for the desired information in the memory of the SPA. This optimization is based on the use of a key (or keys) with a strip table containing strip entries that are organized with respect to the containment of the common, most often required information. Further, the methods and systems optimize the search for the desired information relating to a communication such that the entries in a database are searched in the order of the greatest likelihood of finding the entry including the desired information.

In sum, the methods and systems of the present invention expedite the processing of a communication with respect to a telecommunications service such as an area number service so that the communication may be more quickly routed to its ultimate destination.

Even though the present invention is presented in the context of a telecommunications service, it will be appreciated that the present invention offers advantages to other types of uses. For example, the present invention may be put to use in any type of call or data processing system that requires the retrieval of information prior to the connection or termination of a communication or throughput of the data. In addition, the present invention includes advantages that may be put to use in connection with any type of information retrieval system that requires the retrieval of information from a database that contains a large amount of data. Other areas wherein the present invention also may be used will occur to those skilled in the art.

Therefore, it is an object of the present invention to provide a method and system that expedites call processing by expediting the information retrieval stage of call processing.

It is also an object of the present invention to provide a method and system that expedites call processing with respect to telecommunication services that generally require a database search for information before a particular communication may be further routed.

It is a further object of the present invention to provide a method and system that expedites call processing with respect to telecommunication services such as area number services that use the two query system in conjunction with one or more real-time databases.

In addition, it is an object of the present invention to provide a method and system that alleviates the necessity of making two queries to obtain call processing information with respect to a communication such as used in the two query system.

It is another object of the present invention to provide a method and system that obviates the necessity of devoting a lot of storage medium in a computer system or network serving an area number service or other service to storing one or more real-time databases and the information that they hold for retrieval during call processing.

That the present invention and the exemplary embodiments thereof overcome the drawbacks set forth above and accomplish the objects of the invention set forth herein will become apparent from the detailed description to follow.

BRIEF DESCRIPTION OF THE DRAWINGS

FIG. 3 illustrates an exemplary strip table of strip entries which may be used with an exemplary embodiment of the present invention.

DETAILED DESCRIPTION

I. Introduction—An Overview

Figure 1:
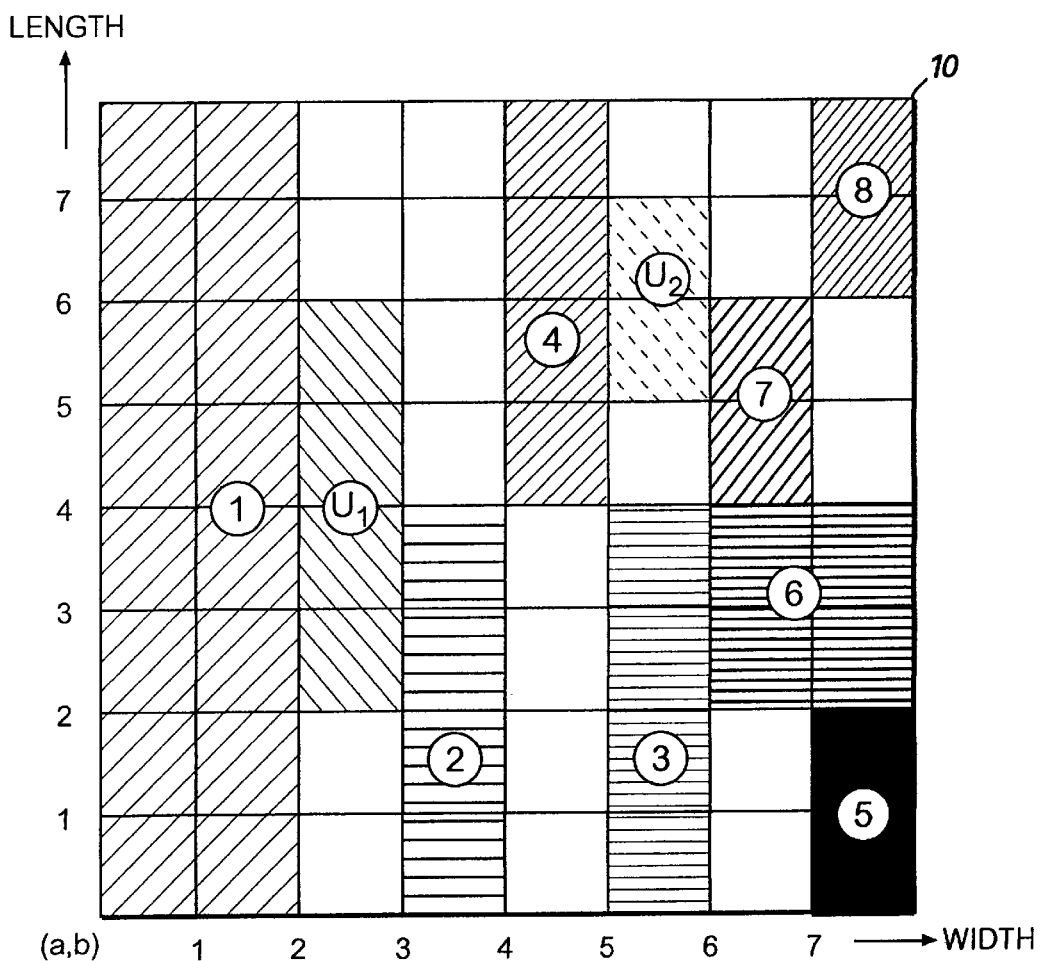
FIG. 1 illustrates an exemplary block of an exemplary grid/block/strip system.

The present invention is described very generally in this introductory section, and then exemplary embodiments thereof are described in more detail with reference to the figures in the sections that follow.

Stated very generally, the present invention provides improved methods and systems for obtaining information relating to a communication. The information is obtained based on a calling number associated with the communication, based on a subscriber area defined within the service area served by a service provider, and based on a common treatment ascribed to all communications received from a particular strip of the subscriber area. Advantageously, the common treatment ascribed to all communications received from a particular strip of the subscriber area results in several desirable features. For example, the common treatment allows for the storage of the majority of information needed for an area number service in the memory of a service package application (SPA) associated with a telecommunications network element such as a service control point (SCP) rather than a realtime database. This storage of information in the memory of the SPA allows for retrieval of the communication routing information with only one query to a real time database in 80–90% of the cases in an area number service, thereby greatly improving call processing time.

In addition, the present invention provides methods and systems to optimize the search for the desired information in the memory of the SPA such that only a minimal amount of information must be searched in order to obtain the desired information. This optimization occurs preferably through the use of a key which is created based on the association of an calling number to a point identifier of the communication. The key is used preferably in a binary/hash search of a strip table for the information that is stored in the strip table on the basis of the common treatment that is ascribed to all communications received from a particular strip of the subscriber area. The preferred methods and systems expedite the processing of the communication so that it may be more quickly routed to its ultimate destination.

Although the context of the present invention is the search for desired information relating to a communication, the principles of the present invention may be applied to other environments that include information arrangement and retrieval.

The present invention is preferably used in connection with a grid/block/strip system set up with respect to a service area. This grid/block/system is set up so as to expedite the retrieval of information relating to a communication received from a calling number representing a location within the service area. The grid is created so as to preferably encompass the service area within a square or rectangle. Thus, the bottom left corner of the grid may be considered to be an origin such as used in an X, Y coordinate system. From this origin, a positive X axis is defined in the conventional manner. A measurement or size reference that is taken in a direction parallel to the X axis with respect to the geographic area is referred to herein in terms of "width". Also from this origin, a positive Y axis is defined in the conventional manner. A measurement or size reference that is taken in a direction parallel to the Y axis with respect to the geographic area is referred to herein in terms of "length". As its appellation implies, the grid includes a plurality of blocks.

The service area also includes one or more subscriber areas defined therein. A subscriber area is preferably defined within the service area by a subscriber to such services. For example, the subscriber area defined by the exemplary burger business may be the area to which the burger business delivers burgers.

Smaller areas are further defined within the subscriber area. Such a smaller area is referred to herein as a strip. A strip encompasses one or more points. A point may represent a telecommunications device, a house or other building, or a particular geographic area. Generally, a point herein corresponds to a calling line number (or calling line numbers) of a caller. A strip serves as the basis for the retrieval of the same information with respect to any of the points encompassed or in the strip. For example, assume that an embodiment of the present invention is used with an area number service. All communications received from calling line numbers that are determined to correspond to points within a particular strip are provided with the same information on the basis that these points are within the particular strip. Thus, all of these communications may be routed to the same location or directory number as designated by the subscriber. In other words, all communications received from points within the strip are routed to the same location or directory number based on the information retrieved as a result of the association of a point with the strip.

A strip is defined within the subscriber area and within a block of the plurality of blocks of the service area. Thus, a strip may encompass an entire block or portions thereof, but may not extend beyond the boundaries of a particular block.

Also, a strip has a size in a particular direction with respect to the geographic area where the size correlates to a power of two in the units used for measuring such size. For example, assume that a particular block has a length of four units. Then, a strip may be defined within the particular block as having a length of four units, two units or one unit. In this example, a strip may have a length that is smaller than a whole unit so long as the fractional amount corresponds to a power of two. Then, a strip may be defined as having a length of ½, ¼, ⅛, 1/16, 1/32, 1/64 unit, or 1/128, etc. In a system that uses nine bits of information to reflect a sub-division of units within a length or width of four miles, then 1/128 is the smallest length of a strip, which is 13.75 yards. For a system using nine bits and having the smallest representable size of 1/128 units, this unit would be represented as 000000001. And likewise, 1/64, 1/32, 1/16, ..., ½, 1, and 2 units are represented as 00000010, 000000100, 000001000, ..., 001000000, 010000000, and 100000000, respectively. In later examples, only the two most significant bits will be used for illustrative purposes (for example, one unit will be represented as 01 and two units at 10) even though the other seven bits are used to define smaller divisions.

In addition, a strip has a position within a block with respect to a particular direction where the position depends on the size of the strip in the particular direction and the correlation of its size in the particular direction to the power of two. For example, assume a particular block has a length of four units. A strip that has a length of four units has only one position with respect to the particular direction of its length because the strip is of the maximum size in length. Consider the next smaller strip which is a strip that is half the length of the maximum length strip, and thus, is a strip that has a length of two units. A strip that has a length of two units has only two possible positions with respect to the particular direction of its length. The first position corresponds to the position of the bottom half of the strip that has a length of four units. The second position corresponds to the position of the top half of the strip that has a length of four units.

Similarly, the next smaller strip which is a strip that has a length of one unit, has the following four possible positions with respect to the particular direction of its length: (1) The first position corresponds to the position of the bottom half of a strip that has a length of two units, and that itself corresponds to the position of the bottom half of the strip that has a length of four units; (2) The second position corresponds to the position of the top half of a strip that has a length of two units, and that itself corresponds to the position of the bottom half of the strip that has a length of four units; (3) The third position corresponds to the position of the bottom half of a strip that has a length of two units, and that itself corresponds to the position of the top half of the strip that has a length of four units.; and (4) The fourth position corresponds to the position of the top half of a strip that has a length of two units, and that itself corresponds to the position of the top half of the strip that has a length of four units. Continuing the example, a strip having the size of half a unit in the particular direction has eight possible positions; a strip having the size of a quarter of a unit in the particular direction has sixteen possible positions; etc.

In sum, with respect to a strip's position, a strip of maximum size in the particular direction has a single position. This position may be determined by a "y-min offset" as explained below. But each next smaller strip has twice the number of positions in the particular direction than the previous larger strip. In other words, a strip has a position within a block with respect to a particular direction where its position corresponds to the position of either the top half or the bottom half of the strip that is the previous larger in size in the particular direction.

FIG. 1 provides illustrations of exemplary different sizes and positions that strips may have within a block 10 which is a square block having a length and a width of eight units. In this example, length is the particular direction. Vertical-horizontal (or X-Y, or width/length) coordinates have been applied to block 10 and are used herein to explain the sizes and positions of the strips with respect to length. Strip 1 is a strip having the maximum length of eight units, and thus, strip 1 has only one position, i.e., strip 1 spans the length of the block.

Strips 2, 3 and 4 are strips with each strip having the next smaller length of four units. In the preferred embodiment, it is unacceptable to have strips with lengths of seven, six or five units. The unacceptability of such lengths stems from the use of binary/hash searching in the preferred embodiment. Strips 2, 3 and 4 may have either of two positions in block 10 with respect to length. Strips 2 and 3 occupy the first of these two positions in that strips 2 and 3 correspond in length position to the bottom half of strip 1. Strip 4 occupies the second of the two positions in that strip 4 corresponds in length position to the top half of strip 1.

In the preferred embodiment, it is unacceptable to have a strip with a length of four units that has a position that corresponds in length to the middle of strip 1. Referring to block 10, it is unacceptable in the preferred embodiment to have a strip positioned as strip U-1 is positioned with respect to length. Strip U-1 corresponds in length to the middle four units of strip 1's eight units of length. The unacceptability of such positioning stems from the use of binary/hash searching in the preferred embodiment.

Strips 5, 6, 7, and 8 are strips with each strip having the next smaller length of two units. In the preferred embodiment, it is unacceptable to have strips with lengths of three units. The unacceptability of such a length stems from the use of binary/hash searching in the preferred embodiment. Strips 5, 6, 7, and 8 may have one of four positions in block 10 with respect to length. Strip 5 occupies the first of these four positions in that strip 5 corresponds in length position to the bottom half of strips 2 and 3, which in turn, correspond in length position to the bottom half of strip 1. Strip 6 occupies the second of the four positions in that strip 6 corresponds in length position to the top half of strips 2 and 3, which in turn, correspond in length position to the bottom half of strip 1. Strip 7 occupies the third of the four positions in that strip 7 corresponds in length position to the bottom half of strip 4, which in turn, corresponds in length position to the top half of strip 1. Strip 8 occupies the fourth of the four positions in that strip 8 corresponds in length position to the top half of strip 4, which in turn, corresponds in length position to the top half of strip 1.

In the preferred embodiment, it is unacceptable to have a strip with a length of two units that has a length position that corresponds in length position to the middle of either strip 2 or strip 4. Referring to block 10, it is unacceptable in the preferred embodiment to have a strip positioned as strip U-2 is positioned with respect to length. Strip U-2 corresponds to the middle two units of strip 4's four units of length. The unacceptability of such positioning stems from the use of binary/hash searching in the preferred embodiment.

Preferably, a strip is defined so as to maximize the size of the strip in the particular direction with respect to the geographic area of the service area. In the preferred embodiment, this particular direction is the direction parallel to the Y axis of the grid or length. A strip preferably is to be defined as large as possible in the direction perpendicular to the particular direction. In the preferred embodiment, this perpendicular direction is the direction parallel to the X axis of the grid or width. In this perpendicular direction, the strip need not have a size that correlates to a power of two in the appropriate units.

In sum, a strip generally is defined as follows:
(1) A strip serves as the basis for the retrieval of the same information with respect to any of the points in the strip.
(2) A strip is defined entirely within the subscriber area.
(3) A strip is defined entirely within a particular block.
(4) A strip has a size in a particular direction so that the size correlates to a power of two in the appropriate units.
(5) A strip has a position within a block with respect to a particular direction that depends on its size in a particular direction.

Further, within these definitions of a strip, the preferences with respect to the definition of a strip are as follows:
(1) A strip preferably is to be defined as large as possible in the particular direction.
(2) A strip preferably is to be defined as large as possible in the direction perpendicular to the particular direction. In this perpendicular direction, the strip need not have a size that correlates to a power of two in the appropriate units.

As noted above, there is a requirement that a strip have a size in a particular direction where the size correlates to a power of two in the appropriate units. This requirement defines the relationship amongst the strips with respect to the varying sizes thereof in the particular direction. This relationship is that each of the varying size strips be half the size in the particular direction as the previous larger strip. By way of explanation, a strip of the largest size in a particular direction is referred to herein as an N-strip or strip of N size. For example, a strip of the longest length possible in the preferred embodiment is referred to herein as an N-strip. A strip of the next-to-largest size in the particular direction is referred to herein as an N/2 strip or strip of N/2 size. This nomenclature reflects the fact that this strip of the next-to-largest size in the particular direction is half the size in the particular direction as the N-strip. For example, a strip of the next-to-longest length in the preferred embodiment is referred to herein as an N/2 size strip or strip of N/2 size, etc. Successively smaller strips each have a size in the particular direction that is half the size in the particular direction of the previous strip.

The present invention is further preferably used in connection with a compendium of information that is referred to herein as a strip table. Like the grid/block/system, the strip table is set up so as to expedite the retrieval of information relating to the communication. This strip table includes a strip entry corresponding respectively to each strip defined with respect to a subscriber within the service area of the service provider. Each strip entry is associated with strip entry information. The strip entry information includes information that may be useful to the further routing of the communication or in other call procedures. Thus, the present invention expedites the retrieval of the desired information by optimizing the process of finding the strip entry in the strip table that is associated with the strip entry information including the desired information.

Pursuant to the present invention, a communication that is received from a calling number is reviewed with respect to the use of the calling number as a representation of or being mapped to a point or particular location within the service area. This review determines the particular block within which the point is located. Additional steps then are taken to find information based on the point's location so that the communication may be further routed or processed. These steps generally include finding the strip that encompasses the point. This strip encompassing the point is referred to herein as the encompassing strip. On the way to finding the encompassing strip, potentially encompassing strips may be reviewed The encompassing strip is found by way of finding the strip entry in the strip table that corresponds to the encompassing strip. This strip entry is referred to as the encompassing strip entry. This encompassing strip entry is associated with encompassing strip entry information. The encompassing strip entry information associated with the encompassing strip entry may be retrieved for use with the communication.

To find the encompassing strip entry, a point identifier may be created based on the point. Also based on the point (and/or the point identifier), a key is created. As based on the point, the key identifies the particular block of the grid system that encompasses the point. A key is used to search the strip table for the desired information. In particular, a key is used to search for the encompassing strip entry that is associated with the encompassing strip entry information including the desired information relating to the communication.

The use of the key with a strip table is optimized so as to retrieve the desired information in an expeditious, optimal manner. One such optimal manner is to limit the use of a key in comparison to only a limited amount of information in the strip table. In particular, a key is used to find a strip entry or strip entries that correspond only to the particular block encompassing the point. In other words, a key is used to check only particular strip entries in the strip table such as the particular strip entries corresponding respectively to strips within the particular block encompassing the point.

Another optimal manner in the use of a key is to use the key to first check the strip entries that correspond to the particular block and that are most likely to contain the desired information. Thus, a key is used in comparison to these strip entries in a particular order of strip entries. This order is a largest to smallest size order with respect to the size of the strips in a particular direction of the geographic area. For example, strip entries may be searched in the following order: (1) strip entries corresponding to N-strips; (2) strip entries corresponding to N/2 strips; (3) strip entries corresponding N/4 strips, etc. In other words, a key is used to find a strip entry that corresponds to a strip having the largest size in the particular direction and that encompasses the point.

More particular details are now offered with respect to the use of a key to check the strip entries in a particular order so as to minimize the amount of information that must be reviewed in order to retrieve the desired information. In particular, a key is used to first make a check of the particular strip entries that correspond to the particular block and that are strips of the largest size in the particular direction of the service area. As noted, the largest size strips are referred to herein as N-strips in that they are strips of size N. For example, referring to FIG. 1, a key is used to check the strip entry that corresponds to strip 1, which is a strip of the largest size in length of block 10. If the point is located in an N-strip, then this N-strip in the particular block is defined to be the encompassing strip. Based on finding the encompassing strip, the desired information relating to the communication may be obtained from the encompassing strip entry information.

If the point is not located in an N-strip or if there are no N-strips in the particular block, then a key preferably is used with respect to the other strip entries corresponding to the particular block. This key may differ from the key in the check described in the previous paragraphs. The difference is a size indicator difference, which is explained in greater detail below. The difference may include a different Ymin offset which determines the "position" as was described above. Again, a key is used in an optimal manner by next checking the strip entries corresponding to the next-to-largest strips in the particular block. As noted above, the preferred next-to-largest strips are strips of half the size of the largest strips, i.e., N/2 strips.

Advantageously, the present invention preferably reduces by half the number of strip entries that must be reviewed for each iteration of strips of a particular size so as to obtain the desired information in the most expeditious manner possible. For example, a key is used only with respect to half of the strip entries corresponding to N/2 strips in the particular direction. For example, referring to FIG. 1, a key is used to check the strip entries that correspond to strips of four units in length and that are positioned either in the top half or the bottom half of block 10, but not both. This reduction by half is another example of an optimal manner provided by the preferred embodiment in the use of a key with the strip table. To accomplish this reduction by half of the information that must be reviewed in each iteration, the preferred embodiment takes advantage of the well known computer searching technique of binary/hash searching. With respect to the half of the N/2 strips that are reviewed, a key is used to make a check of the half of the N/2 strip entries. Based on this technique of binary/hash searching, the half of the N/2 strips that are reviewed are preferably all either positioned in the top half or the bottom half of the particular block depending on the key. If the point is located in an N/2 strip, then this N/2 strip in the particular block is defined to be the encompassing strip. Based on finding the encompassing strip, the desired information relating to the communication may be obtained from the encompassing strip entry information.

If the point is not located in an N/2 strip or if there are no N/2 strips in the particular block, then a key preferably is used with respect to the other strip entries corresponding to the particular block, i.e., strips of size N/4, N/8, . . . . This key may differ from the key in the check described in the previous paragraphs. The difference is a size indicator difference, which is explained in greater detail below. The difference may include a different Ymin offset. Again, a key is used in an optimal manner by next checking the strip entries corresponding to the third largest strips in the particular block. As noted above, the preferred third largest strips are strips of half the size in the particular direction of the next-to-largest strips, i.e., N/4 strips. As with the N/2 strips, the present invention preferably reduces the number of strip entries corresponding to the N/4 strips that must be reviewed to obtain the desired information. Based on the technique of binary/hash searching, the N/4 strips that are reviewed are preferably all located within the top half or bottom half of the area that corresponds to the N/2 strips that were reviewed. Thus, by very few checks or look-ups the area of the block that is effectively reviewed is reduced from the whole block to a quarter of the block.

If the point is not located in an N/4 strip or if there are no N/4 strips in the particular block, then a key preferably is used with respect to the other strip entries corresponding to the particular block. This key may differ from the key in the check described in the previous paragraphs. The difference is a size indicator difference, which is explained in greater detail below. The difference may include a different Ymin offset. In particular, a key is used in the manner described above with respect to strip entries corresponding to N/8 strips (if there are any), and then, another key may be used with respect to strip entries corresponding to N/16 strips, (if there are any), and so forth. This iterative use of a key is continued until an encompassing strip is found or until there are no more strip entries corresponding to the strips of the particular block to be reviewed.

The very general description of the present invention provided above lays the foundation for additional details regarding the exemplary embodiments provided in the sections below.

II. Environment of Embodiments of the Present Invention

Embodiments of the present invention may be used in situations that involve a high degree of data grouping. Embodiments may be used in connection with telecommunications services that seek to retrieve information regarding a communication from an information source such as a real-time database. To illustrate operation of the exemplary embodiments of the present invention, this description uses an area number service (ANS) and its operation in an Advanced Intelligent Network (AIN) as a contextual example. Additional details regarding operation of an AIN or similar telecommunications network may be obtained from the commonly assigned patent to Weisser, U.S. Pat. No. 5,430,719, which is incorporated herein by reference. Although an area number service is provided as the contextual example, the present invention is not to be limited to such an environment. Operation of the present invention in other contexts will occur to those skilled in the art such as in the above-mentioned situations that involve a high degree of data grouping.

III. Description of Grid/Block/Strip System—FIGS. 2A–2E

Figure 2A:
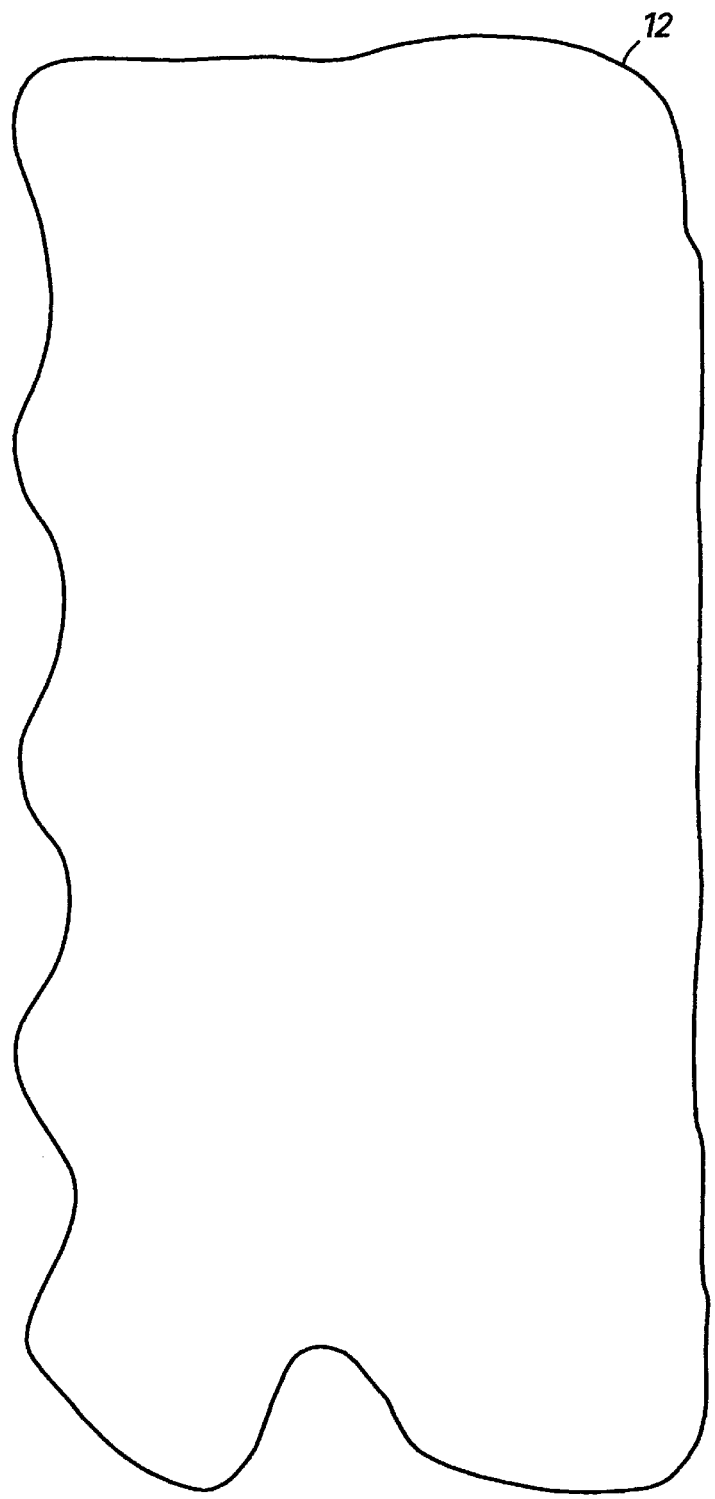
FIG. 2A illustrates an exemplary geographic area with respect to which an exemplary embodiment of the present invention may be used.

FIG. 2A illustrates an exemplary geographic area 12 wherein a telecommunications service provider offers an area number service to its subscribers. Such a geographic area 12 also may be referred to herein as a service area. This service area 12 serves as the basis for the description of the grid/block/strip system as may be used in connection with an exemplary embodiment of the present invention.

A. An Exemplary Grid/Block System

1. Configuration of an Exemplary Grid

Figure 2B:
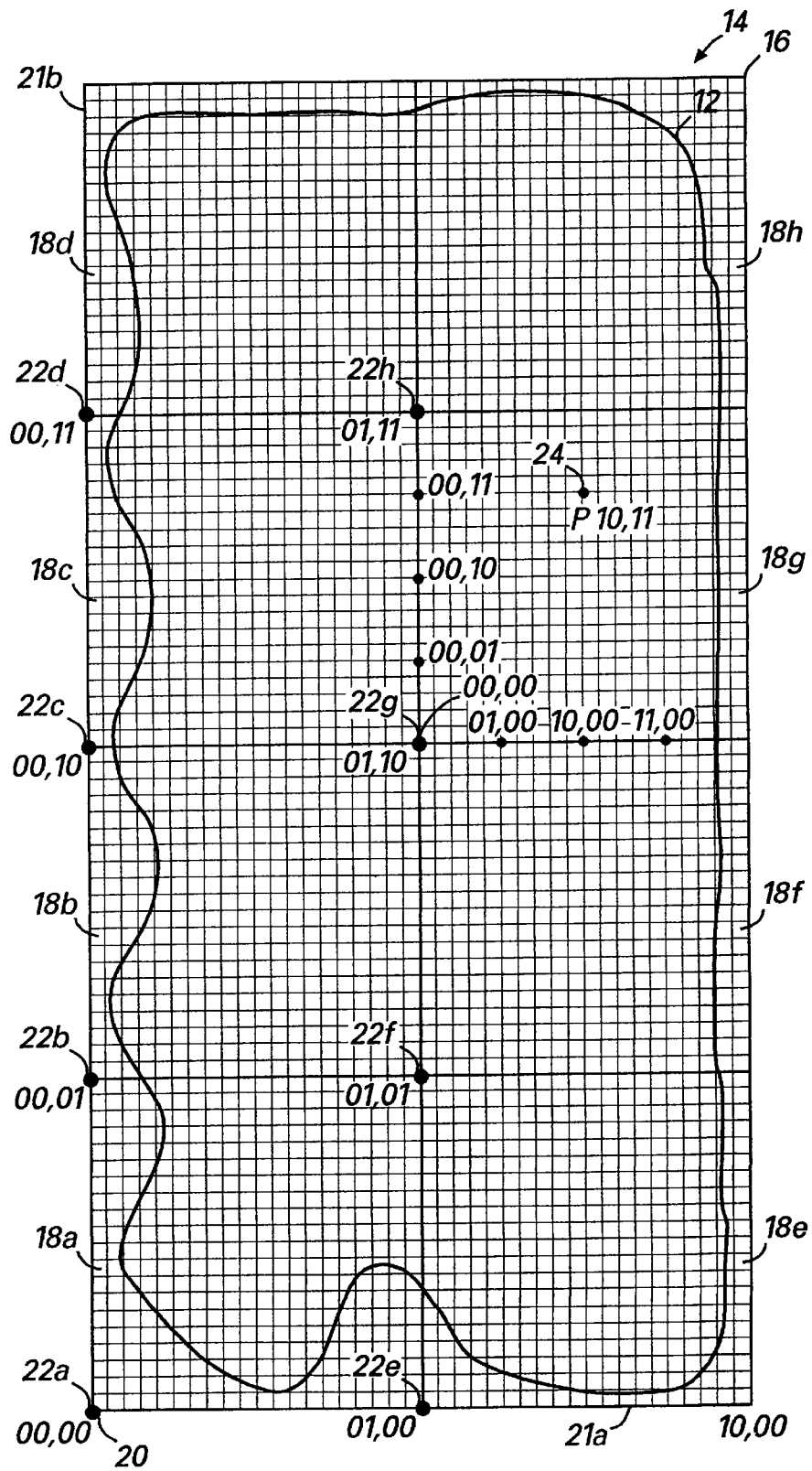
FIG. 2B illustrates an exemplary grid/block system 14 applied to the service area illustrated in FIG. 2A.

FIG. 2B illustrates an exemplary grid/block system 14 applied to the service area 12 illustrated in FIG. 2A. The service area 12 is represented by way of a grid 16 that encompasses the service area 12. Preferably, the grid 16 is a rectangle and includes an origin at its lower left corner. In addition, preferably, the length of the rectangle may be divided into regularly spaced units such that the total number of such units along the length of the rectangle is a power of two. Similarly, preferably, the width of the rectangle may be divided into regularly spaced units such that the total number of such units along the width of the rectangle is also a power of two. The length of the rectangle does not necessarily have to be the same as the width of the rectangle. The units may be miles, kilometers, portions thereof, or other versions of distance demarcation. As an example, consider that a local access transport area (LATA) as a service area in a telecommunications network may be encompassed by a grid that has an area of 131,072 square miles with a length of 512 and a width of 256. This is based on the following:

Area=length×width $2^{(x+y)} = (2^y)(2^x)$ $2^{17} = (2^9)(2^8)$ 131,072=(512)(256)

This example is based on a thirty-two bit machine with a length and width using nine and eight bits, respectively. Other machine allocations may be different and different length and width allocations are also possible.

2. Exemplary Definition of Blocks Within the Grid

Referring again to FIG. 2B, the exemplary grid 16 is made up of a plurality of square blocks 18a–18h. Preferably, each of the square blocks 18a–18h is of the same predetermined size as the other blocks in the grid 16. In addition, preferably, each of the square blocks 18a–18h has a length and width that may be divided into regularly spaced units such that the total number of such units along the length or the width of a block is a power of two. Even further, preferably, each of the square blocks 18a–18h has a length of four miles and a width of four miles for a total square area of sixteen miles in this example. In the preferred embodiment, as is explained below, each of these square blocks is assigned a block identification (ID).

In the operations that are described below, if a block of four miles in length or width has a block ID that is represented with nine bits of information, then the granularity with respect to locating points in this block is on the order of 13.75 yards. This granularity is determined by multiplying four miles×1,760 yards per mile, and then dividing this result by 512 which is the number of bit combinations that are possible with nine bits in a binary system. For example ((4×1760)/512=13.75)

3. A Primary Reference Scheme Assigned to the Exemplary Grid/Block System

Further, a primary reference scheme is assigned to the grid 16 which is preferably based on the well known X, Y coordinate system. This X, Y coordinate scheme may also be referred to as a vertical-horizontal (V-H) system. The lower left corner 20 (or origin) of the grid 16 is designated as the primary reference point with respect to the X, Y coordinate scheme. The primary reference point 20 is assigned the X, Y coordinates of 00,00. From this primary reference point 20, the horizontal axis 21a of the grid 16 provides for X coordinates at regularly spaced intervals. The vertical axis 21b of the grid 16 provides for Y coordinates at regularly spaced intervals. This reference scheme is used to assign a block identifier (block ID) 22a–22h to each of the blocks 18a–18h of the grid 16. A block ID 22a–22h is assigned respectively to each of the blocks 18a–18h as based on the X, Y coordinates corresponding to the lower left corner of each of the blocks 18a–18h. This lower left corner of a block is referred to herein as a reference point. In addition, each of the block IDs 22a–22h is assigned based on a binary numbering system. This assignment of block IDs based on the binary numbering system is facilitated by the fact that the number of blocks along the length of the grid 16 or along the width of the grid 16 is preferably a power of two. Thus, as illustrated in FIG. 2B, the following table sets forth the correlation between a block and its block ID:

| Block Reference Numeral | Block Identification |
|---|---|
| 18a | 00,00 |
| 18b | 00,01 |
| 18c | 00,10 |
| 18d | 00,11 |
| 18e | 01,00 |
| 18f | 01,01 |
| 18g | 01,10 |
| 18h | 01,11 |

4. An Exemplary Secondary Reference Scheme Assigned to the Grid/Block System

As noted above, a primary reference scheme is assigned to the grid 16 with the primary reference point being the lower left corner 20 of the grid 16. A secondary reference scheme is assigned to each of the blocks 18a–18h in the grid 16. This secondary reference scheme has the same format as the primary reference scheme. But instead of being used with respect to the grid 16, the secondary reference scheme is used separately with respect to each block of the grid 16. Thus, the secondary reference scheme also is preferably based on the well known X, Y coordinate system.

The lower left corner of each block is designated as a secondary reference point with respect to the X, Y coordinate scheme. Each of the secondary reference points is assigned the X, Y coordinates of 00,00. From this secondary reference point, the horizontal axis of a block provides for X coordinates at regularly spaced intervals. The vertical axis of the block provides for Y coordinates at regularly spaced intervals. In addition, the X, Y coordinates are assigned based on a binary numbering system. This assignment based on the binary numbering system is facilitated by the fact that the number of regular spaced units of a block along the length of the block or along the width of the block is preferably a power of two. As noted above, preferably, each of the blocks 18a–18h has a length of four miles (or four units) and a width of four miles (or four units) in this example.

To illustrate the secondary reference scheme, the reader is referred to FIG. 2B and to block 18g. The lower left corner of block 18g is designated as the secondary reference point of this block and is assigned the X, Y coordinates of 00,00. (The clever reader will have noticed that this same lower left corner of block 18g is assigned the coordinates of 01,10 as the block ID for this block in the primary reference scheme.) Referring again to the secondary reference scheme, from the secondary reference point of 00,00, the horizontal axis of this block 18g provides for X coordinates at regularly spaced intervals. Also from the secondary reference point of 00,00, the vertical axis of this block 18g provides for Y coordinates at regularly spaced intervals. Thus, a point in this block 18g may be assigned coordinates based on the secondary reference scheme as applied to block 18g. These coordinates reflect the X offset and Y offset of the point's position from the secondary reference point of the block. In other words, the X offset represents the difference in distance along or in parallel with the X axis between the point and the secondary reference point of the block. The Y offset represents the difference in distance along or in parallel with the Y axis between the point and the secondary reference point of the block.

FIG. 2B illustrates a point "P" 24 in block 18g that is assigned X, Y coordinates of 10,11. These coordinates reflect the fact that point P 24 is positioned by an X offset of 10 and a Y offset of 11 from the secondary reference point of 00,00 in block 18g.

5. Locating a Point in the Block/Grid System

By way of further explanation of the block/grid system, a general and then a specific way of locating a point in the block/grid system is now described. Assume the service area 12 includes a plurality of points dispersed throughout the area. A point of the service area 12 may be generally found within the grid 16 by reference to the block ID of the block containing the point. For example, point P 24 may be generally found within the grid 16 by reference to the block ID (01,10) 22g of block 18g. A point may be more specifically located in the grid 16 by reference to an X offset and a Y offset with respect to the secondary reference point of the block wherein the point is located. As noted, the secondary reference point of a block is associated with the block ID of the block. Thus, a point may be specifically located based on information including its block ID and its X offset and Y offset. This information is referred to herein as the point identifier. For example, the point identifier of point P 24 may be characterized as follows:

| Point Identifier of | Block Identifier | Y Offset | X Offset |
|---|---|---|---|
| Point P | 01,10 | 11 | 10 |

In the preferred embodiment of the present invention, a correspondence table is maintained in a database between points (calling line numbers) in the grid and their respective point identifiers.

6. Translation of a Calling Line to a Point and/or Its Point Identifier

Pursuant to an exemplary embodiment of the present invention, a potential caller within the service area 12 may be identified by identification of the calling line number associated with the communication. A calling line number also may be referred to herein as a calling line or calling party number. Each of these calling line numbers may be considered to represent or be mapped to a point in the service area 12. As the representation of a point in the service area 12, a calling line number is assigned a point identifier. The point identifier typically includes the appropriate block ID and X offset and Y offset with respect to this block ID to particularly locate the calling line number or point within the grid 16 representing the service area 12. Preferably, as noted above, the information used to translate the calling line number to a point identifier may be stored in a database for consultation as part of or in connection with the exemplary embodiment.

B. An Exemplary Definition of Strips Within a Subscriber Area Encompassed by a Service Area to Which the Grid/Block System Has Been Applied A description is now provided of an exemplary definition of a subscriber area within the service area 12 of a service provider followed by an exemplary definition of strips within the subscriber area.

1. Definition of a Subscriber Area Within the Service Area 12

Figure 2C:
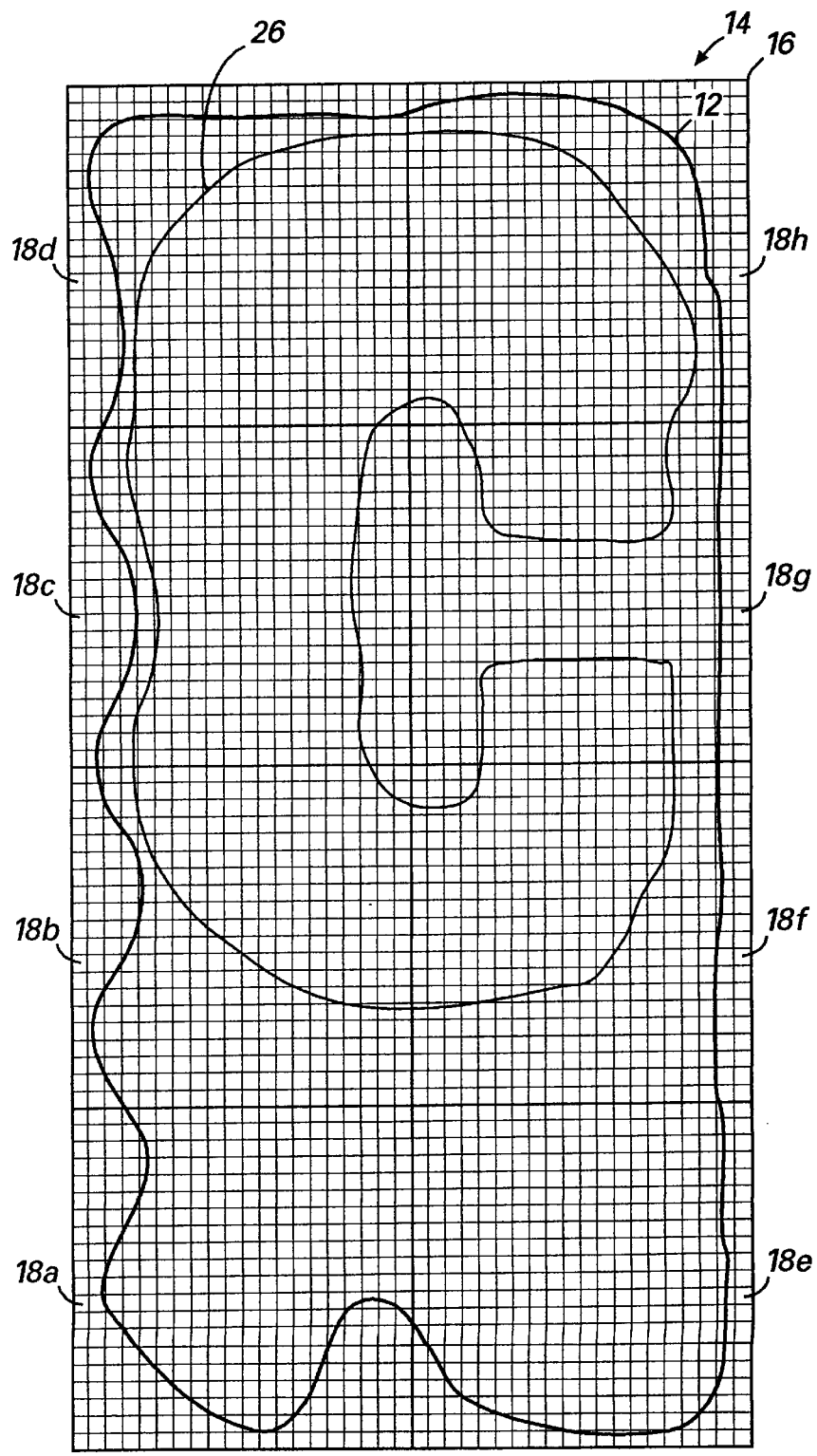
FIG. 2C illustrates an exemplary subscriber area defined within the service area illustrated in FIG. 2A.

FIG. 2C illustrates an exemplary subscriber area 26 defined within the service area 12 illustrated in FIG. 2A. As noted, the present invention may be used in connection with a call routing service offered to subscribers such as an area number service. As part of this area number service, a subscriber may designate a subscriber area 26 within the service area 12. As illustrated in FIG. 2C, this subscriber area 26 is encompassed within the service area 12. In addition, this subscriber area 26 occupies portions of the same geographical area as represented by the six blocks 18b–18d and 18f–18h of the service area 12. For example, subscriber area 26 may represent the area to which the burger business delivers burgers.

The subscriber may designate that communications received from calling line numbers from the subscriber area 26 be routed to a particular location or directory number. This location or directory number is typically associated with the subscriber. For example, the burger business may use a directory number of BUR-GERR. Further, the subscriber may divide this subscriber area 26 into subscriber sub-areas. With respect to each subscriber sub-area, the subscriber may designate that communications received from calling line numbers from this subscriber sub-area be routed to a particular location or directory number. The locations or directory numbers may be different for each subscriber sub-area. As will be explained below, an exemplary embodiment of the present invention facilitates this call routing service by minimizing the storage requirements for keeping track of a subscriber's routing designations and by looking up the call routing information more quickly. Through the use of strip information, the present invention consolidates the information for routing purposes that is stored in the memory of the service package application of the area number service. In most cases, the desired information is obtained from the strip table. But when the desired information is not obtainable from the strip table, then it may be obtained from the real-time database.

2. Definition of Strips Within the Subscriber Area

Figure 2D:
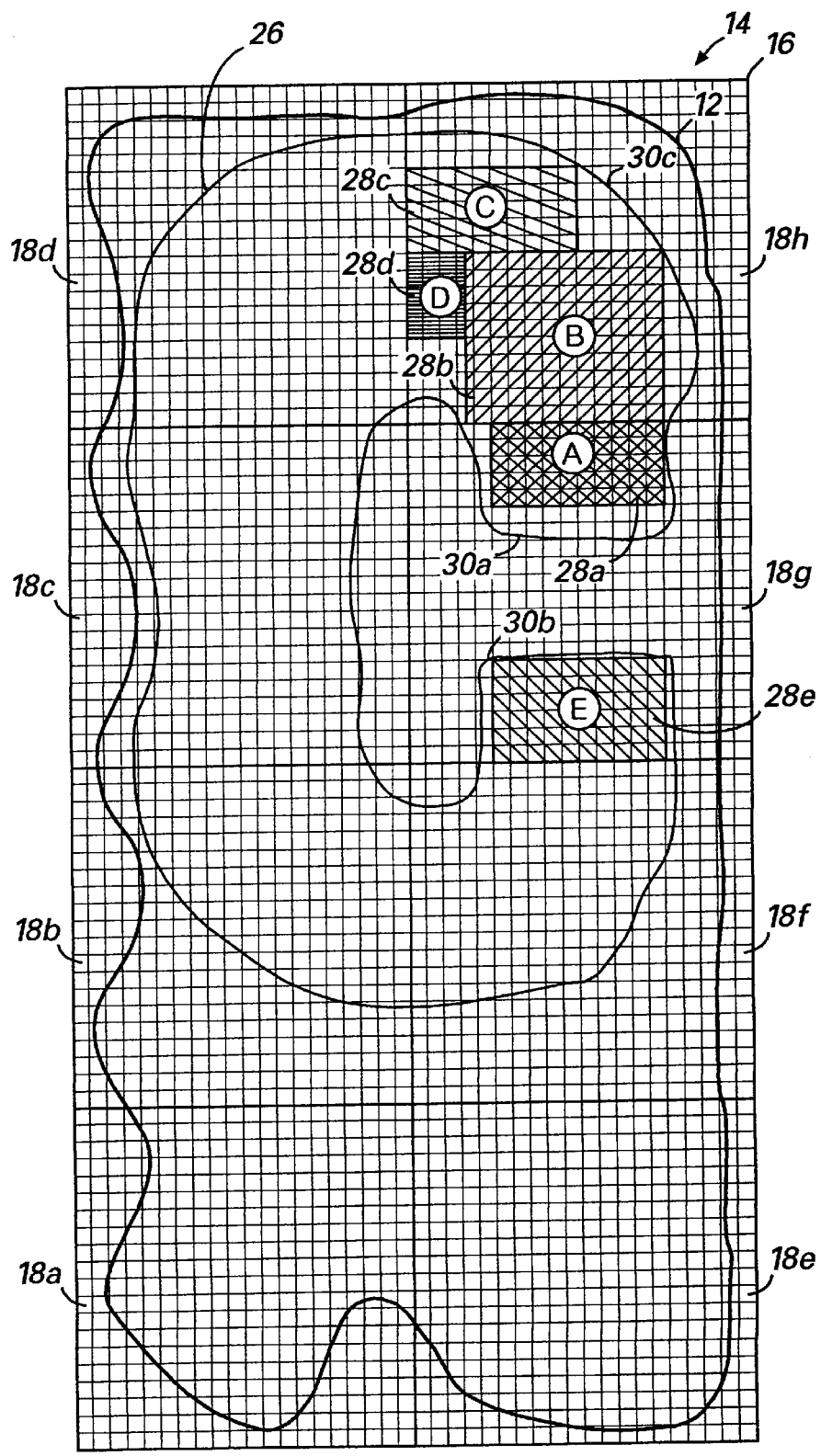
FIG. 2D illustrates an exemplary subscriber area defined within the service area illustrated in FIG. 2A and illustrates some strips defined within a subscriber area.

FIG. 2D illustrates an exemplary subscriber area 26 defined within the service area 12 illustrated in FIG. 2A and also illustrates strips A–E 28a–28e defined within the subscriber area 26. An exemplary embodiment facilitates the area number service through the use of the above described representational grid/block system 14 and other information as is now generally described. As noted, a subscriber to the area number service may designate a subscriber area 26 and/or subscriber sub-areas within the service area 12. An exemplary embodiment provides that these areas be reviewed with respect to the grid/block system 14 described above and that these subscriber areas be divided pursuant to certain constraints into one or more strips. Each strip typically includes one or more points which correspond to calling line numbers. With respect to a particular strip, all communications received from calling line numbers that are determined to correspond to points within the particular strip are routed to the same location or directory number as designated by the subscriber. In other words, a determinative feature of a strip is that all communications received from points within the strip are routed to the same location or directory number.

To provide an example of the definition of strips within a subscriber area, reference is made to FIG. 2D. The three portions 30a–30c of the subscriber area 26 that are encompassed by blocks 18g and 18h are used as examples for the definition of strips 28a–28e. In particular, two distinct (non-contiguous) portions 30a, 30b of subscriber area 26 are present in block 18g. As is explained below in connection with FIG. 2E, portion 30a encompasses strip A 28a and portion 30b encompasses strip E 28e. A single portion 30c of subscriber area 26 is present in block 18h. As also is explained below, portion 30c encompasses three strips, to-wit: strip B 28b, strip C 28c and strip D 28d. With respect to each of these strips A–E 28a–28e, all communications received from calling line numbers that are determined to correspond to points within one of these strips are routed respectively to the same location or directory number as designated by the subscriber. Thus, all communications received from points in strip A 28a are routed to the same location or directory number; all communications received from points in strip B 28b are routed to the same location or directory number (which may or may not be the same location or directory number to which communications from points in strip A 28a are routed), etc.

a. Subscriber Portions 30a—Strip A

Figure 2E:
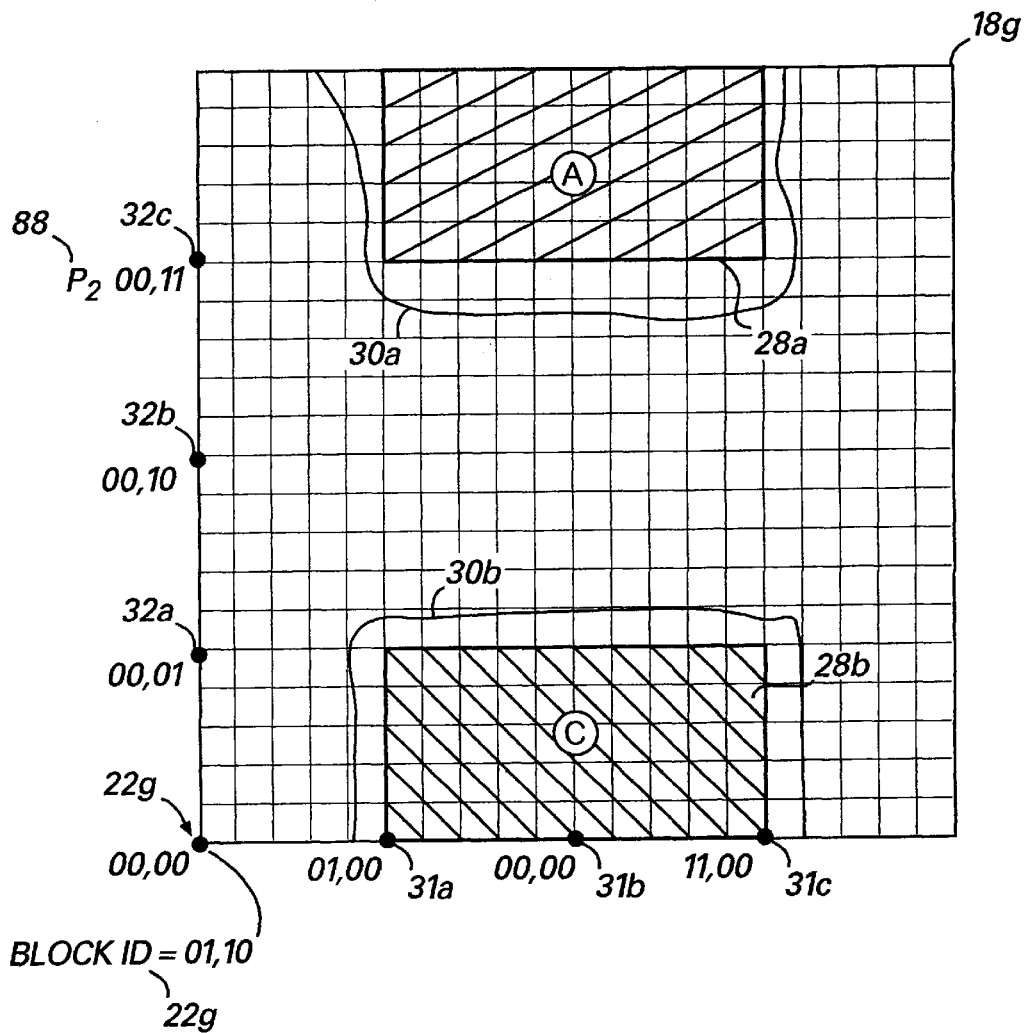
FIG. 2E illustrates an exemplary block of the grid/block/strip system illustrated in FIG. 2D.

FIG. 2E illustrates in greater detail the exemplary block 18g of the grid/block/strip system 14 illustrated in FIG. 2D. Block 18g has a secondary reference point (00,00) at its lower left corner (which is the same as its primary reference point (01,10) 22g). Block 18g has a length and width that is divided into regularly spaced units such that the total number of such units along the length or the width of a block is a power of two. As illustrated, block 18g reflects the use of binary coordinates in the X, Y coordinate system of the secondary reference scheme used with respect to the units of the block 18g. Along its width, block 18g has four regularly spaced units beginning with 00,00 22g and then following with 01, 00—31a, 10,00—31b, and 11,00—31c. Along its length, block 18g has four regularly spaced units beginning with 00,00 22g and then following with 00,01—32a, 00,10—32b, and 00,11—32c. Of course, each of these units may be further divided into regularly spaced sub-units, sub-sub-units, etc.

As noted above, a portion 30a of the subscriber area 26 is located in block 18g. A strip A 28a is defined in this subscriber portion 30a. Within the constraints and preferences in defining a strip, otherwise a strip may be defined pursuant to the subscriber's preferences based on myriad reasons so that all communications from the strip are routed to the same location. Thus, all communications from this strip A 28a are to be routed to the same location. In other words, the information retrieved for a point that is encompassed by this strip is the same as the information retrieved for any other point that is encompassed by this strip. Strip A 28a is defined entirely within the subscriber area 26, within the block 18g, and thus, within the subscriber portion 30a. The size of strip A 28a in the Y direction (i.e., the strip's length) is selected so that it correlates to a power of two in the appropriate units and so that it is the largest such size within the constraints. In this case, the length of strip A 28a is defined as one unit. On the other hand, the width of strip A 28a is defined as two units. In this manner, strip A 28a occupies as much of the subscriber portion 30a as possible.

Further, strip A 28a may be described by its boundaries of Ymin, Xmin, and Xmax, by its size in the particular direction, and by using the binary coordinates for the units of the block 18g. Strip A 28a includes a Ymin boundary of 11 in that strip A is one unit in length as marked from the horizontal line that has a Y coordinate of 11 in the secondary reference scheme used with the block 18g. Strip A 28a includes an Xmin boundary of 01 in that strip A is two units in width as marked from the vertical line that has an X coordinate of 01. Strip A 28a includes a Ymin boundary of 11 and a size of one unit in length as marked from the Ymin boundary of 11. Strip A 28a includes an Xmax boundary of 11 in that strip A is two units in width as marked from the Xmin boundary of 01.

For various reasons, including the nature of the subscriber area itself, a subscriber may have selected that a subscriber portion such as portion 30a have two strips defined therein rather than the described single strip A 28a. In that case, each of these strips would be of one unit in length, one unit in width, and have the same Ymin and size boundaries. But the respective Xmin and Xmax boundaries of these strips would differ. For example, referring to FIG. 1, strip 2 and strip 3 in block 10 have the same Ymin and Ymax boundaries. But the respective Xmin and Xmax boundaries of strips 2 and 3 differ. To further aid in the differentiation of strips such as these strips that share a Ymin boundary and have the same length, the preferred embodiment assigns each of these strips a sequence number. The sequence number of a strip, if it has a sequence number, is carried as a field of information in the strip entry key of the strip. For example, strip 2 of block 10 would have a different sequence number from strip 3 of block 10.

b. Subscriber Portion 30b—Strip E

Still referring to FIG. 2E, as noted above, a portion 30b of the subscriber area 26 is located in block 18g. All communications from this strip E are to be routed to the same location, which may not be the same location as with strip A 28a. Strip E 28e is defined entirely within the subscriber area 26, within the block 18g, and thus, within the subscriber portion 30b. The size of strip E 28e in the Y direction (i.e., the strip's length) is selected so that it correlates to a power of two in the appropriate units and so that it is the largest such size within the constraints. In this case, the length of strip E 28e is defined as one unit. On the other hand, the width of strip E 28e is defined as two units. In this manner, strip B 28b occupies as much of the subscriber portion 30b as possible.

Further, strip E 28e may be described as defined by its boundaries of Ymin, Xmin, and Xmax, by its size in the particular direction, and by using the binary coordinates for the units of the block 18g. Strip E 28a includes a Ymin boundary of 00. Strip E 28b includes an Xmin boundary of 01. Strip E 28b includes a Ymin boundary of 00 and a size of one unit in length as marked from the Ymin boundary of 00. Strip E 28b includes an Xmax boundary of 11 in that strip E is two units in width as marked from the Xmin boundary of 01.

A comparison of strip A 28a and strip E 28e results in the finding that these strips are of the same size and have the same Xmin boundary and Xmax boundary. But these strips differ as being encompassed by different portions of the subscriber area and by having different Ymin boundaries.

c. Subscriber Portion 30c—Strips B, C and D

Referring again to FIG. 2D, a single portion 30c of subscriber area 26 is present in block 18h. As illustrated, portion 30c encompasses three strips, to-wit: strip B 28b, strip C 28c and strip D 28d. In reviewing the subscriber portion 30c, various combinations of strips may have been defined. Of course, these combinations of strip definitions depend also on the desires of the subscriber in routing communications from a particular strip to a particular location. The example provided below of the definition of strips B 28b, C 28c and D 28d constitutes one of the possible combinations for this subscriber portion. Nevertheless, the example illustrates one combination of definition of a portion of subscriber area into strips.

With respect to strip B 28b, this strip is defined entirely within the subscriber area 26, within the block 18h, and thus, within the subscriber portion 30c. The size of strip B 28b in the Y direction (i.e., the strip's length) is selected so that it correlates to a power of two in the appropriate units and so that it is the largest such size within the constraints. In this case, the length of strip B 28b is defined as two units. The width of strip B 28b is greater than 2.2 units.

With respect to strip C 28c, this strip is defined entirely within the subscriber area 26, within the block 18h, and thus, within the subscriber portion 30c. The size of strip C in the Y direction (i.e., the strip's length) is selected so that it correlates to a power of two in the appropriate units and so that it is the largest such size within the constraints. In this case, the length of strip C 28c is defined as one unit. The width of strip C 28c is defined as two units.

With respect to strip D 28d, this strip is defined entirely within the subscriber area 26, within the block 18h, and thus, within the subscriber portion 30c. The size of strip D 28d in the Y direction (i.e., the strip's length) is selected so that it correlates to a power of two in the appropriate units and so that it is the largest such size within the constraints. In this case, the length of strip D 28d is defined as one unit. On the other hand, the width of strip D 28d is less than a unit, i.e. approximately 0.6 units.

IV. Description of Strip Table

A. Environment of a Strip Table

FIG. 3 illustrates an exemplary strip table of strip entries 40 which generally functions as a storage mechanism for information regarding each strip. When used in connection with the area number service, this strip table 40 is stored in the memory of a service package application (SPA) that is used in connection with the area number service.

Typically, an SPA is housed in a telecommunications network element known as a service control point (SCP). The storage of the strip table in the memory of an SPA contrasts with the present use of real-time databases for the storage of information related to area number services as explained in the background. Advantageously, the storage of the strip table in the memory of an SPA expedites information retrieval, and thus call processing. The desired information may be retrieved from the SPA much more quickly than from the real-time database. Nonetheless, as those skilled in the art will understand, a strip table may be stored in a database or as part of a database such as a real-time database.

As noted above, the present invention may be used so that the desired information may be obtained from the strip table in the memory of the SPA with respect to calls from points within the subscriber area. There may be occurrences when the desired information may not be obtained from the strip table. This may occur when a call is received from a point that is not encompassed by a strip in the subscriber area. When the desired information may not be obtained from strip table, then this information may be sought from a real-time database. By including the information in the strip table in the memory of the service package application, the inventors project that most information sought for communication routing will be obtained from the strip table.

B. Structure of a Strip Table

In particular, information regarding a strip is stored in a strip entry. Preferably, each strip entry includes a strip entry key (SEK) and strip entry information. Preferably, all of the information in a strip table is saved in binary form. The strip entries are formed or incorporated into a strip table which pertains to a subscriber of the service and there is a table for each subscriber. As will be described below, the strip table and more particularly, the strip entries in the strip table are reviewed by the exemplary system to quickly look up call routing information relating to a subscriber. Thus, a strip table of strip entries is created for each subscriber and the subscriber's designation of strips in the subscriber area of the service area of the service provider.

Referring to FIG. 3, the strip table 40 includes a representative plurality of strip entries 42a–42e. Each of these strip entries 42a–42e includes a strip entry key (SEK) and strip entry information as indicated by the headings 44 and 46 in the strip table 40. As is explained below, a key is used preferably in a search of only the SEKs of the strip entries that correspond to a particular block of the grid for a matching SEK. Once the matching SEK is found, then further steps may lead to retrieving the desired information from the strip entry information corresponding to the matching SEK.

1. Strip Entry Key (SEK)

With respect to the composition of each strip entry 42a–42e, the strip entry key 44 includes four types of information regarding a strip as indicated by the following headings: (1) strip entry key (SEK) block identifier (ID) or SEK BLOCK ID 48; (2) a strip entry key (SEK) offset 50; (3) a SEK sequence number 52; and (4) a strip entry key size indicator (SEK size ind.) 54.

First, the strip entry key (SEK) block identifier 48 includes information pertaining to the block ID of the block encompassing the strip corresponding to the strip entry. In the preferred embodiment, the SEK block ID includes information of fourteen bits.

Second, the strip entry key (SEK) offset 50 includes information as to the Ymin boundary of the strip corresponding to the strip entry. In the preferred embodiment, the SEK offset includes information of nine bits.

Third, a sequence number, as explained above in connection with the definition of strips, is a number or other indicator that differentiates strips that share a common Ymin boundary and a common length. Thus, the SEK sequence number 52 includes information with respect to the sequence number, if any, of the strip corresponding to the strip entry. In the preferred embodiment, the SEK sequence number includes information of five bits.

Fourth, the SEK size indicator 54 includes information with respect to the size in a particular direction of the strip corresponding to the strip entry. For example, the SEK size indicator 54 may include the length of the strip. Preferably, the SEK size indicator includes four bits with the following representations in binary form with respect to units of size:

| SEK SIZE INDICATOR | | | | | |
|---|---|---|---|---|---|
| | Units in size | | | | |
| Not used | 4 | 2 | 1 | 1/2 | 1/4 |
| 0000 | 0001 | 0010 | 0011 | 0100 | 0101 |

2. Strip Entry Information

Still referring to the composition of a strip entry 42a–42e, the strip entry information 46 of each strip entry 42a–42e includes three types of information regarding a strip corresponding to the strip entry as indicated by the following headings: (1) Xmin offset 56; (2) Xmax offset 58; and (3) section identifier (ID) 60.

First, the Xmin offset 56 includes information as to the Xmin boundary of the strip corresponding to the strip entry. In the preferred embodiment, the Xmin offset includes nine bits of information.

Second, the Xmax offset 58 includes information as to the Xmax boundary of the strip corresponding to the strip entry. In the preferred embodiment, the Xmax offset includes nine bits of information.

Third, the section ID 60 includes the desired information with respect to the routing or other processing of the communication. In the preferred embodiment, the section ID includes information of thirty-two bits.

C. Exemplary Strip Entries in the Strip Table

The exemplary strip table 40 includes five strip entries 42a–42e with each of these entries and the information contained therein corresponding respectively to one of the strips A–E 28a–28e illustrated in FIG. 2D. Thus, strip entry 42a corresponds to strip A, strip entry 42b corresponds to strip B; etc. A column 62 indicating the correspondence between the exemplary strips 28a–28e and the exemplary strip entries 42a–42e is provided in FIG. 2 for the convenience of the reader. These exemplary strip entries 42a–42e are used to provide an explanatory example of the preferred operation of the present invention as is described below.

V. Preferred Operation of the Present Invention

A. Overview—FIG. 4

Figure 4:
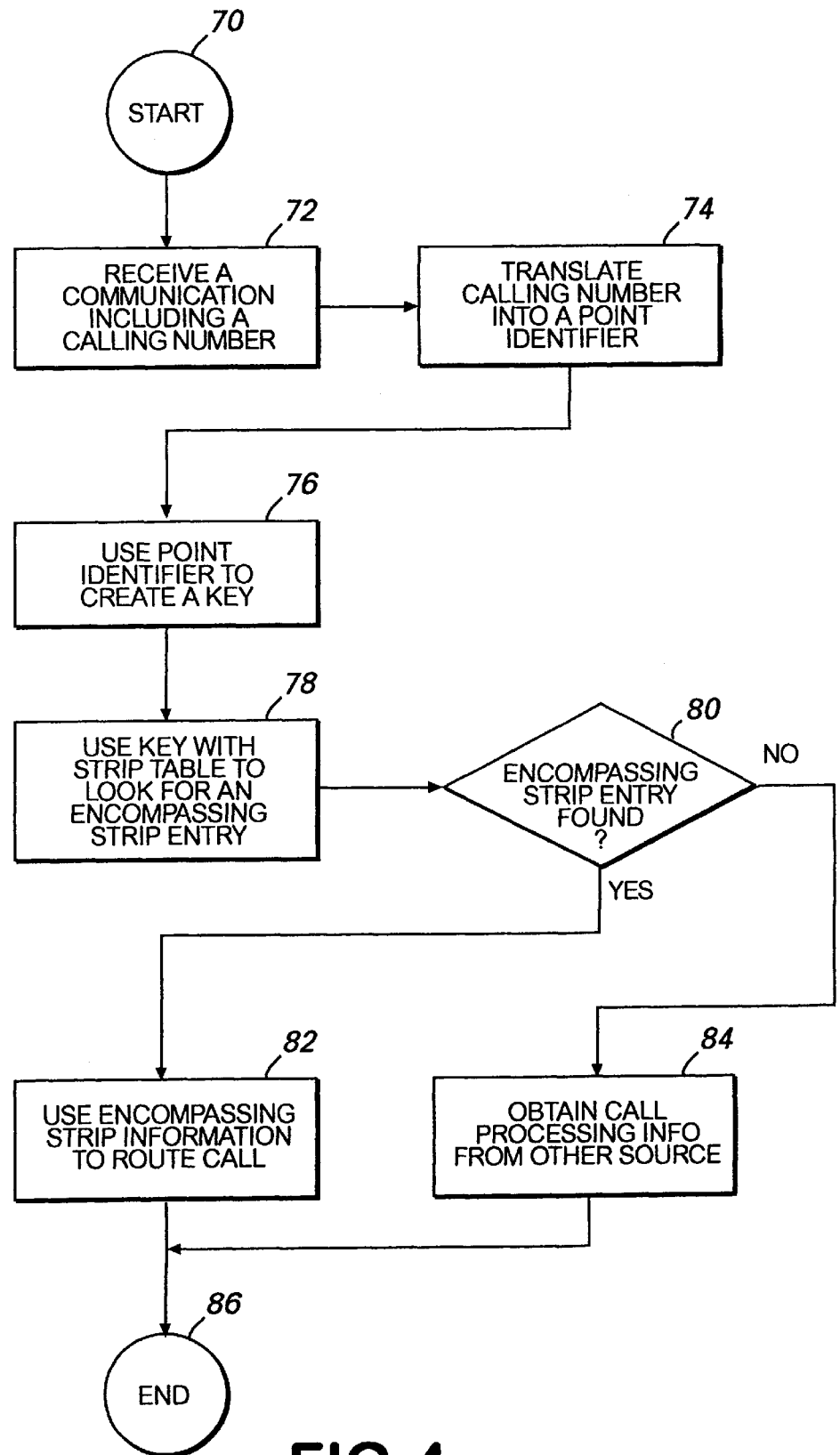
FIG. 4 is a flow chart that provides an overview of the preferred operation of the present invention in connection with an area number service.

FIG. 4 is a flow chart that provides an overview of the preferred operation of the present invention in connection with an area number service. Additional details regarding the preferred operation follow in connection with the discussion of FIGS. 5, 6A–6C and 7A–7C.

FIG. 4 is entered at start step 70 and progresses to step 72 wherein a communication including a calling number is received. Based on the directory number that is dialed in connection with initiation of the communication, the communication is recognized as directed to a subscriber of an area number service. The calling number is recognized as representing a point or location within the service area of the telecommunications service provider that provides the area number service. Upon receipt of the communication, in step 74 the calling number is translated into a point identifier based on the point as represented by the calling number.

A point identifier of a point includes a block identifier, a Y offset and an X offset with respect to the point. The block identifier (block ID) identifies the particular block of the grid which encompasses the point. As explained above, the block ID is part of the primary reference scheme assigned to the exemplary grid/block system. In contrast, the Y offset and the X offset of the point identifier are part of the secondary reference scheme assigned to the particular block. Thus, the Y offset represents the difference in distance along or in parallel with the Y axis between the point and the secondary reference point (or origin) of the particular block. The X offset represents the difference in distance along or in parallel with the X axis between the point and the secondary reference point of the particular block. In the preferred embodiment, the point identifier includes thirty-two bits. In order of most significance, these thirty-two bits include fourteen bits for the block ID, nine bits for the Y offset, and nine bits for the X offset.

After the calling number is translated into the point identifier, then in step 76 the point identifier is used as the basis for the creation of a key. Preferably, a key is created as based on the calling number of the communication in that the calling number serves as the basis for the point identifier. Preferably, a key includes four types of information: (1) a block ID; (2) a Y offset; (3) a sequence number; and (4) a size indicator. Also in the preferred embodiment, a key includes thirty-two binary bits distributed amongst the types of information. Of the thirty-two bits, in order of most significance, the fourteen most significant bits correspond to the block ID, the next most significant bits correspond to nine bits for the Ymin offset, the next-to-next most significant five bits correspond to the sequence number, and the least significant four bits correspond to the size indicator.

First, a key includes the block ID for the particular block encompassing the point.

Second, a key includes a Y offset derived from the Y offset of the point identifier or of the Y coordinate in X, Y coordinates. As the key may be changed during repeated checks or look ups of the strip table, this Y offset may be correspondingly changed as is explained below in connection with FIGS. 5–7. Advantageously, the Y offset of a key serves to effect a modified form of binary/hash searching of the entries in the strip table. The Y offset effects this binary/hash searching by limiting the search to strip entries that correspond to strips that have a Ymin boundary within a region of the particular block. For example, a specific Y offset may limit searching to strip entries that correspond to strips in the either the top half or the bottom half of the particular block. If further searching is to take place, then such searching takes place with respect to strip entries that correspond to strips in either the top half or the bottom half of the previously searched half. This is different from binary/has searching because the Y offset may provide an indication as to which half the point is located in.

Third, a key may include a sequence number or place holder for a sequence number. The sequence number is used to differentiate strips with the same size and same Y offset. Not all strips require a sequence number, and thus, the field for a sequence number may initially include a place holder or some other indicator such as "0". As the key may be changed during repeated searches of the strip table, this sequence number may be correspondingly changed as is explained below in connection with FIGS. 5–7.

Fourth, a key includes a size indicator. The size indicator reflects the size in a particular direction with respect to the geographic area of the particular block of a strip. Initially, a key may be configured to check for a matching strip entry with respect to strip entries that correspond to strips that are the largest in size in the particular block. Thus, a key may be initially configured to include a size indicator that corresponds to the largest size allowed in the particular block/grid/system system in use. For example, as illustrated in FIGS. 2A–2E, the largest size indicator in the exemplary block/grid/strip system is four units in length.

Referring again to FIG. 4, after a key is created in step 76, then in step 78 a key is used as the tool to search the strip table 40 for an entry corresponding to a strip that encompasses the point. Additional details regarding this step are discussed below in connection with FIG. 5. After the key is used to search the strip table 40, in step 80 a check may be carried out to determine whether an encompassing strip entry is found. If the encompassing strip entry is found, then in step 82 the strip entry information from the encompassing strip entry may be retrieved and used to route or otherwise process the communication. Preferably, as is explained below, the desired information is retrieved from the strip entry information that corresponds to the section ID. This section ID may provide information with respect to further routing of the communication based on the preferences indicated by the subscriber indicated through the supply of information corresponding to the section ID for a particular strip. After the information is retrieved, the method then ends in step 86.

On the other hand, if the encompassing strip entry is not found, then in step 84 call processing information is obtained from other sources. For example, a communication may be received from a calling number that represents a point that is not encompassed by any strip in the subscriber area. In this case, the area number service resorts to retrieval of call routing information from a source other than the strip table. This other source may be a real-time database. Nevertheless, the present invention greatly reduces queries to the source other than the strip table. Advantageously, the use of the strip key to search the strip table for routing information significantly shortens call processing time and minimizes the data storage requirements for the routing information. After the information is retrieved, the method then ends in step 86.

B. Details of Using a Key with Respect to the Strip Table—FIGS. 5–7

Figure 5:
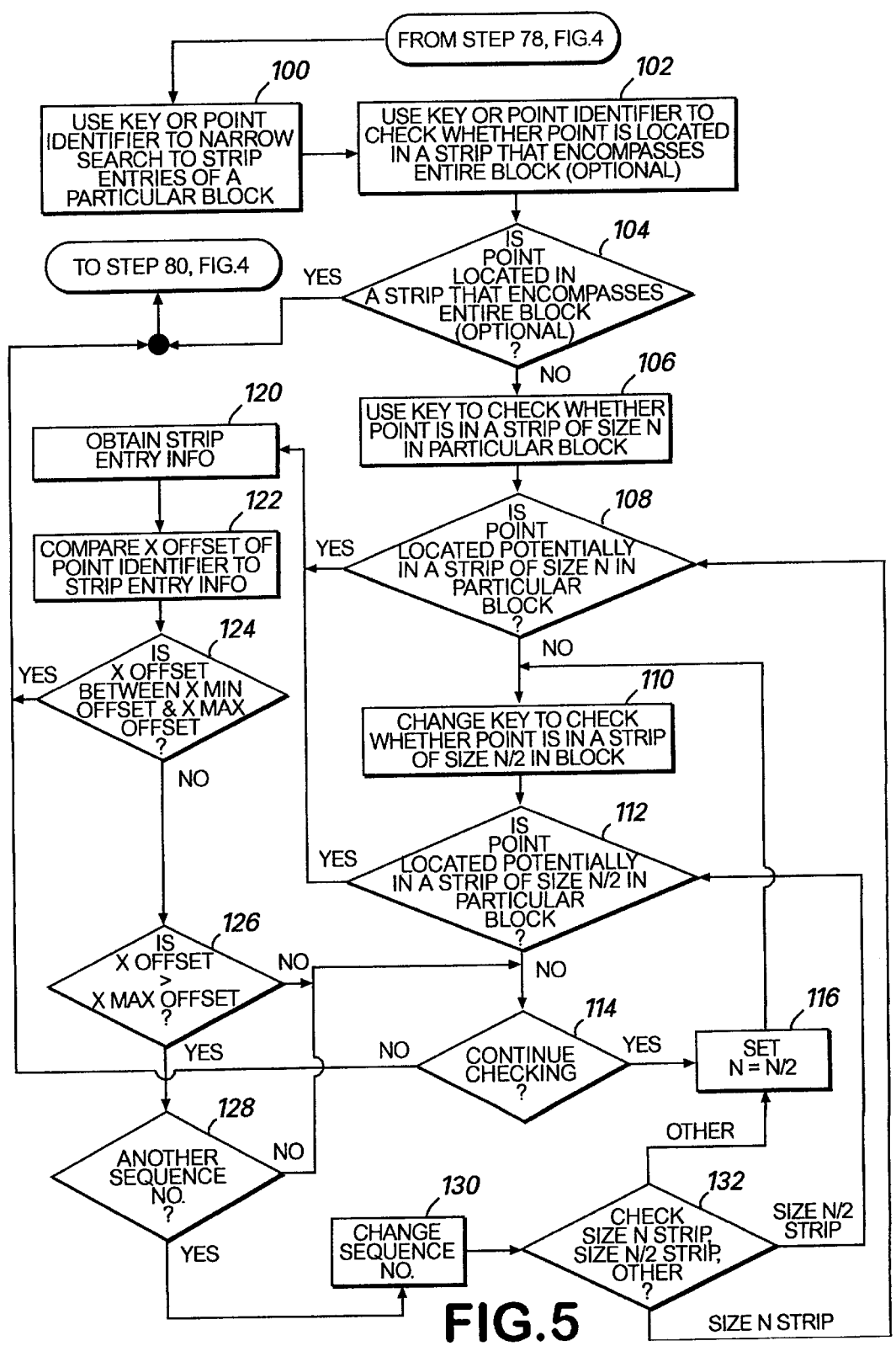
FIG. 5 is a flow chart that provides additional details of the preferred operation of the present invention in connection with step 78 of FIG. 4.

FIG. 5 is a flow chart that provides additional details of the preferred operation of the present invention in connection with step 78 of FIG. 4. In particular, FIG. 5 provides additional details with respect to using a key as a tool to search the strip table 40 for an entry corresponding to a strip that encompasses the point. To further illustrate the steps of FIG. 5, an example is provided of the retrieval of routing information in an area number service for a communication that is received from a calling number that is represented by a point P-2 88 as illustrated in FIG. 2E. Point P-2 88 is translated through the use of a database to have a point identifier as follows:

| Point Identifier of | Block Identifier | Y Offset | X Offset |
|---|---|---|---|
| Point P-2 | 01,10 | 11 | 00 |

This point identifier identifies point P-2 88 as encompassed by the particular block 18g on the basis of the block identifier 01, 10.

Figure 6A:
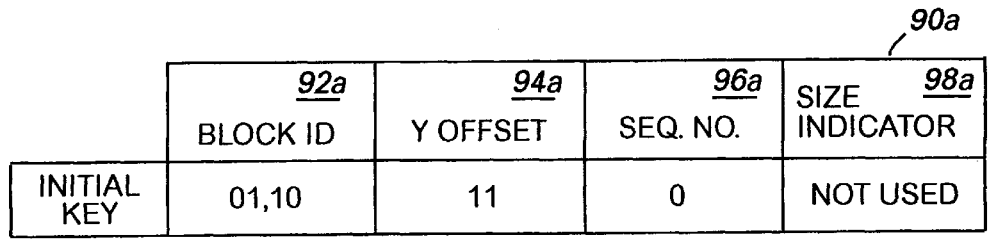
FIG. 6A illustrates a key that may be used with an exemplary embodiment of the present invention.

Based on this point identifier, a key 90a is created as illustrated in FIG. 6A. As a first key that is created for use in connection with retrieving information for use in routing the communication, this key is referred to herein as the initial key for ease of explanation. The initial key 90a includes information that is directly based on the point identifier of point P-2 88, to-wit: a block ID 92a of 01,10; and a Y offset 94a of 11. As an initial key, some of the information in this key 90a is automatically determined or determined by selectable defaults. Thus, in the initial key 90a, the sequence number 96a is set to a default of 0 and the size indicator 98a corresponds to a place holder or other null space ("not used" in the drawing) rather than to a size indicator of a strip. Alternatively, an initialization to 0 may be made.

Now referring to the flow diagram of FIG. 5, once the initial key 90a has been created, in step 100 the key 90a may be used to check only particular strip entries. These particular strip entries correspond respectively to strips within the particular block as identified by the block ID. Alternatively, rather than key 90a, in step 100 the point identifier for point P-2 88 may be used to narrow the search for an encompassing strip entry by using the block ID of the point identifier to check only particular strip entries.

After narrowing the search to particular strip entries corresponding to strips in the particular block, in optional step 102 the key may be used to check whether the strip table includes an encompassing strip entry that corresponds to an encompassing strip that encompasses the particular block as well as the point P-2 88. In other words, the key is used to check whether the strip encompasses the whole block. Alternatively, rather than key 90a, in step 102 the point identifier for point P-2 88 may be used to check whether the strip table includes an encompassing strip entry that corresponds to an encompassing strip that encompasses the particular block as well as the point P-2 88.

In the preferred embodiment, optional step 102 is carried out by certain sub-steps. Per these sub-steps, a mask ("and-mask 1") is applied in a binary "AND" operation against the point identifier plus other 0 bits. As used herein, a mask is a binary system mask that includes information that corresponds directly to the information in a key. Thus, a mask includes information that corresponds to a block ID, a Ymin offset, a sequence number, and a size indicator. Also in the preferred embodiment, a mask has the same number of binary bits as the key and/or point identifier, to-wit: thirty-two bits. Of these thirty two-bits, the mask includes fourteen bits for the block ID, nine bits for the Ymin offset, five bits for the sequence number, and four bits for the size indicator.

In and-mask 1, the information corresponding to the block ID includes all "1s" Also in and-mask 1, the information corresponding to the Ymin offset, the sequence number, and the size indicator includes all "0s". Thus, the and-mask using thirty-two digits preferably appears as follows: 11111111111111 000000000 000000000. As a result of the application of and-mask 1 against the point identifier, the result is a block key. The block key includes information corresponding to the block ID of the point identifier and "0s" corresponding to the Ymin offset, the sequence number, and the size indicator. Thus, the preferred sub-steps of optional step 102 may be summarized as follows:

Point identifier AND And-Mask 1=Block key of P-2

Effectively, this block key is used with the strip table to search for a matching strip entry key (SEK) of a strip entry that corresponds to a strip that encompasses the entire particular block.

If this optional step 102 of using the key or point identifier to check whether the point is located in a strip that encompasses the entire block is carried out, then it is preferably followed by step 104 of determining whether the check was positive or negative. If the check was positive, then the method proceeds to step 80, FIG. 4 as described above. If the check was negative, then the method proceeds to step 106.

Still referring to FIG. 5, in step 106 a key is used with the strip table to effectively check whether a point is potentially encompassed by a strip of size N in the particular block. In particular, a key is used with the strip table to find a potentially encompassing strip by making a check of the particular strip entries to determine that the point is located in an N-strip in the particular block. The term "potentially encompassing" is used, because further steps may have to be taken to determine whether a strip is an encompassing strip rather than a potentially encompassing strip as is explained below. Even more particularly stated, a key may be used in a search of the strip entry keys (SEKs) of the strip entries of the strip table to find a matching SEK.

In the preferred embodiment, step 106 is carried out by several sub-steps. Per these sub-steps, a mask ("or-mask 2") is applied to the block key. If there is no block key (i.e., optional steps 100, 102, 104 are omitted) then a block key may be created as described above in connection with those steps. In particular, or-mask 2 is applied to the block key in a binary "OR" operation to obtain a key that is referred to herein as the post-mask 2 key 90b.

The or-mask 2 effectively sets the size. In or-mask 2, the information corresponding to the block ID is "0s", the information corresponding to the Ymin offset is "0s", the information corresponding to the size of four units, represented as 1 (represented as 0001) and the information corresponding to the sequence no. is "0s". Thus, the or-mask using thirty-two digits preferably appears as follows: 00000000000000 000000000 00000 0001. The effect of the block key having all 0s as the Ymin offset with or-mask 2 also having all 0s as the Ymin offset is 0s in the result of the masking operation. In this example, a Ymin offset of 0s as a result of the masking operation is that effectively the key search for a SEK that corresponds to a strip having a Ymin offset of 0, i.e., the strip's length begins (so to speak) at the bottom (x-axis, horizontal axis) of the particular block.

In addition, in or-mask 2, the information corresponding to the size indicator is set to the largest size allowed for strips in the system used. This largest size is referred to herein as a strip of N size. By setting the size indicator to the largest size, the preferred embodiment first checks for strip entries that correspond to the largest strips in the particular block. In this manner, the preferred embodiment increases the chances of finding the desired information with a minimum of effort in checking the strip table. Thus, the information corresponding to the size indicator is N. In the example provided, N=0001, representing four units. As noted, or-mask 2 is applied against the block key in an "OR" operation to obtain a post-mask 2 key.

Figure 6B:
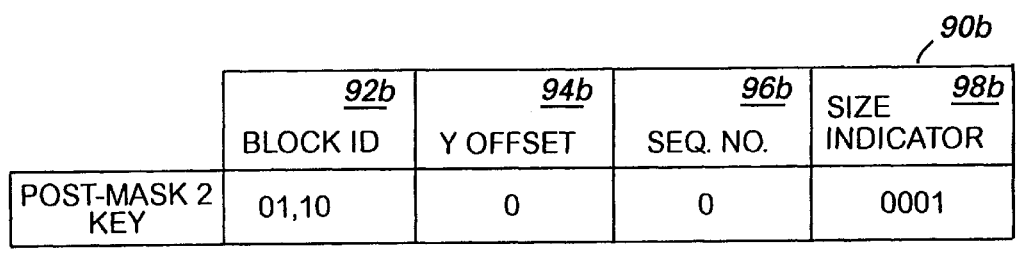
FIG. 6B illustrates another version of the key illustrated in FIG. 6A.

FIG. 6B illustrates a key that is referred to as a post-mask 2 key 90b. This key 90b includes the following information: a block ID 92b of 01,10; a Y offset 94b of 00; a sequence number 96b of 00; and a size indicator 98b of 4 (represented as 00001). Thus, the preferred sub-steps of step 106 may be summarized by the binary operation as follows:

Block key OR Or-Mask 2=Post-mask 2 key

Effectively, this post-mask 2 key 90b is used to search the strip table for a matching strip entry key (SEK) of a strip entry that corresponds to a strip that has a strip size of N.

Figure 7A:
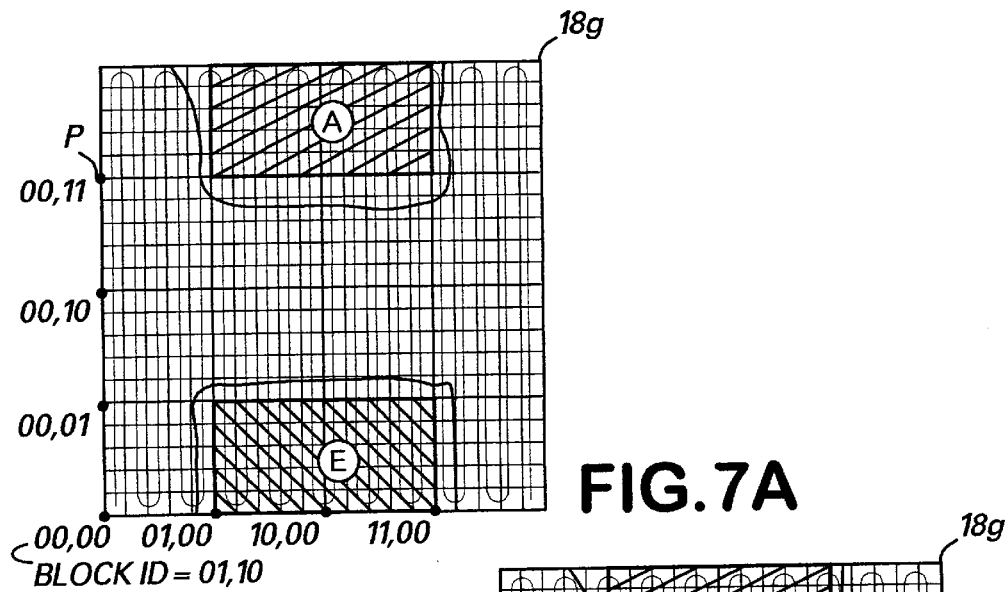
FIG. 7A illustrates a block of a grid/block/system such as illustrated in FIG. 2D.

FIG. 7A illustrates block 18g with cross-hatching that covers the entire block 18g. This cross-hatching reflects the fact that the post-mask 2 key 90b is used, effectively, to check whether the point is particularly encompassed by an N-sized strip.

Referring again to FIG. 5, if step 106 of using a key to check whether the point is potentially located in a strip of size N is carried out, then step 106 is preferably followed by step 108 of determining whether a potentially encompassing strip entry has been found. If the check is positive, then the method proceeds to step 120 with regard to obtaining strip entry information as is further discussed below.

If the check in step 108 is negative, then in step 110 a key is used to check whether a point is potentially encompassed by a strip of size N/2 in the particular block. In particular, the key is used with the strip table to find a potentially encompassing strip by making a check of the particular strip entries to determine whether the point is located in an N/2-strip in the particular block. The key used in the N-strip check may be used if that key is changed to reflect this check for a strip of a different (next smaller) size, and possible change of Ymin offset.

In the preferred embodiment, step 110 is carried out in several sub-steps to ultimately obtain a key that referred to herein as the post-mask 3 key. In this example, the block areas are of size N/2 which equals two units. First, a mask ("and-mask 3") is applied in a binary "AND" operation to the point identifier to obtain a result referred to as a point identifier/mask result.

The composition of and-mask 3 includes information corresponding to the block ID such that such information is all "1s". The information corresponding to the Ymin offset in and-mask 3 depends on the size of the strips to be searched. The information for the Ymin offset in and-mask 3 preferably results in the masking out of all Y offset bits in the point identifier that are less than the size of the strip to be checked. For example, if strip entries corresponding to strips eight units in length are to be checked, then the information for the Ymin offset in and-mask 3 is selected so that the result is that of masking out of Y offset bits in the point identifier that are less than eight. As another example, if the Y offset bits in the point identifier are 011, and if the strips being checked are four units in length, then the information for the Ymin offset in and-mask 3 is selected to mask, as follows: 0■. To accomplish this with an AND operation, the information for the Ymin offset in and-mask 3 preferably corresponds to those Y offset bits in the point identifier as 1■. By using a "1" followed by "0s" in and-mask 3 in the information relating to the Ymin offset, binary/hash searching of the strip table is effected. This binary/hash searching results in a narrowing of the search of the strip table to strip entries that correspond to strips in either the top half or the bottom half (but not both) of the particular block as determined by the application of and-mask 3 against the Y offset of the point identifier.

In addition, in and-mask 3, the information corresponding to the sequence no. is "0s" and the information corresponding to the size indicator is "0s". Thus, the and-mask 3 using thirty-two digits preferably appears as follows: 11111111111110 100000000 000000000. As noted, and-mask 3 is applied against the point identifier to obtain a point/identifier mask result. In this example, after application of and-mask 3, the point/identifier mask result includes the following information: a block ID of 01,10; a Y offset of 10; a sequence number of 00; and a size indicator of 00.

After the point/identifier mask result is obtained, the next preferred sub-step to obtaining the post-mask 3 key is to apply a mask ("or-mask 4") to the point/identifier mask result. Or-mask 4 is applied in a binary "OR" operation against the point/identifier mask result. The composition of or-mask 4 is as follows: the information corresponding to the block ID is all "0s", the information corresponding to the Ymin offset is all "0s", and the information corresponding to the sequence no. is all "0s". In addition, in or-mask 4, the information corresponding to the size indicator is set to the next-to-largest size allowed for strips per the requirements of strip definition in the system used. This next-to-largest size is referred to as a strip of N/2 size. By setting the size indicator to the next-to-largest size, the preferred embodiment checks for strip entries that correspond to the next-to-largest strips in the particular block. In this manner, the preferred embodiment increases the chances of finding the desired information with a minimum of effort in checking the strip table. Thus, the information corresponding to the size indicator is N/2. In the example provided, N=0010 representing two units. Thus, the or-mask 3 using thirty-two digits preferably appears as follows: 00000000000000 000000000 00000 0010. As noted, and-mask 3 is applied against the block key in an "AND" operation to obtain the point/identifier mask result. As noted, or-mask 3 then is applied against the point identifier/mask result to obtain a post-mask 3 key.

Figure 6C:
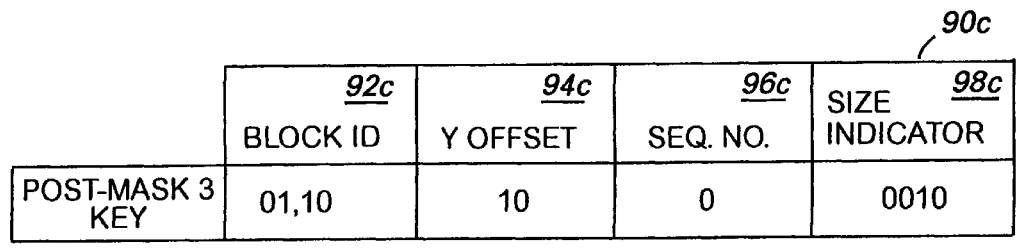
FIG. 6C illustrates yet another version of the key illustrated in FIG. 6A.

FIG. 6C illustrates a key that is referred to as a post-mask 3 key 90c. This key 90c includes the following information: a block ID 92c of 01,10; a Y offset 94c of 10; a sequence number 96c of 00; and a size indicator 98c of 2 (represented as 0010). Thus, the preferred sub-steps of step 110 may be summarized as follows:

Point identifier AND And-Mask 3=Point/identifier/mask result

Point identifier/mask result OR Or-Mask 3=Post-mask 3 key

Effectively, this post-mask 3 key 90c is used to search the strip table for a matching strip entry key (SEK) of a strip entry that corresponds to a strip that is present in the top of the particular block 18g and has a strip size of N/2.

Figure 7B:
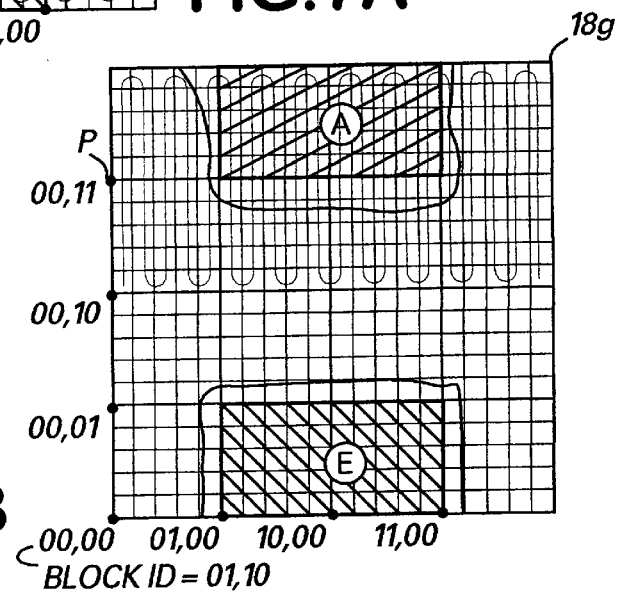
FIG. 7B illustrates a block of a grid/block/system such as illustrated in FIG. 2D.

FIG. 7B illustrates block 18g with cross-hatching that covers the top half of block 18g. This cross-hatching shows the vertical limitations of the point as determined by the post-mask 3 key.

If this step 110 of using the key to check whether the point is potentially located in a strip of size N/2 is carried out, then it is preferably followed by step 112 of determining whether the check is positive or negative. If the check is positive, then the method proceeds to step 120 with regard to obtaining strip entry information as is further discussed below.

If the check with respect to N/2 strips is negative, then the method may continue by using a key to check whether the point is potentially encompassed in a strip of N/4 size. To check whether the strip is potentially encompassed in a N/4 strip, generally the same sub-steps as carried out in step 110 are carried out, but with a couple of changes. The information of the Ymin offset in the first mask of these sub-steps is changed to reflect the next smaller size of strips to be checked. As noted, the information for the Ymin offset in this first mask preferably results in the masking out of all Y bits in the point identifier that are less than the size of the strip to be checked. Also, in the second mask of these sub-steps, the information corresponding to the size indicator is changed as appropriate.

If the check with respect to the N/4 strips is positive, then the method proceeds to step 120 with regard to obtaining strip entry information as is further discussed below. If this check with respect to N/4 strips is negative, then the method may continue by using a key to check whether the point is encompassed in a strip of N/8 size in a manner preferably as described in connection with step 110 and including changes as discussed in this paragraph with respect to N/4 strips. In other words, the method may continue to check for a strip that potentially encompasses the point by repeated iterations of the changing and checking steps described above in connection with steps 106 and 110. But in each successive iteration, the method checks for strip entries corresponding to strips of half the size of the strips corresponding to strip entries checked in the previous iteration.

Figure 7C:
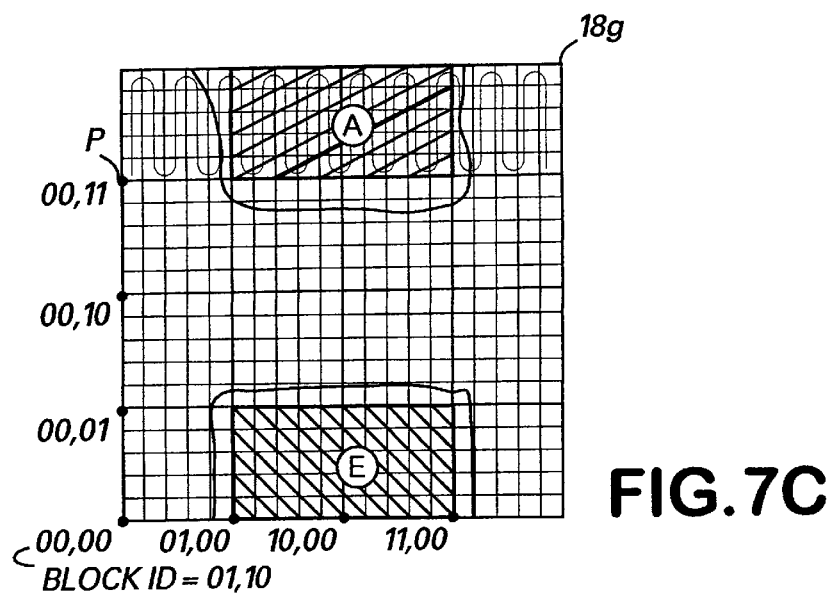
FIG. 7C illustrates a block of a grid/block/system such as illustrated in FIG. 2D.

For example, FIG. 7C illustrates block 18g with cross-hatching that covers the top quarter of block 18g. This cross-hatching reflects the fact that in the next iteration of this example, a check would be made to determine whether the point is encompassed by an N/4-sized strip in the top quarter of the block 18g. The method may continue these repeated iterations until a matching strip entry is found, until there are no more strip entries in the strip table to be checked, i.e., the smallest size strip has been checked, or until some other interrupt occurs. This repetitive methodology is illustrated in FIG. 5 by the check step 114. If check step 114 is positive, then in step 116 the step of setting N=N/2 is carried out in that sub-steps such as the preferred sub-steps discussed above in connection with steps 106 and 110 may be taken to effectively check for strip entries that correspond to strips of half the size of the strips corresponding to strip entries checked in the previous iteration. After step 116, the method returns to step 110 for the repeated methodology. On the other hand, if the check step 114 is negative, then the method proceeds to step 80, FIG. 4 as described above.

An embodiment of the present invention provides that a customer-check may be made prior to each iteration of checking whether the point is potentially encompassed in a strip of the next smaller size. The customer check determines whether any strips of the next smaller size are associated with information of that customer. If so, then the check of the next smaller size strips continues. Otherwise, the iteration relating to the next smaller size strips may be skipped, i.e., return to step 80.

As mentioned above, if the check for a matching strip entry key is positive during the checking methodology such as in connection with steps 108 and 112, then the method proceeds to step 120 with regard to obtaining information relating to the communication from the potentially encompassing strip entry information. In the preferred embodiment, once the matching strip entry key is found, then the matching strip entry information is obtained. This strip entry information includes an Xmin offset, an Xmax offset and a section ID. In step 122, a comparison is made between the X offset of the point identifier and the Xmin offset and the Xmax offset of the strip entry information. In an embodiment of the present invention, using thirty-two bits, obtained through an AND operation between the point identifier and the following mask: 00000000000000000000000 111111111.

In step 124, a check is made to determine whether the X offset of the point identifier is greater than the Xmin offset and less than the Xmax offset. In other words, a check is made to determine whether the point lies between the Xmin and Xmax boundaries of the strip that corresponds to the matching strip entry. If the check step 124 is positive, then the encompassing strip has been found and the method proceeds to step 80, FIG. 4 as described above.

Still referring to FIG. 5, if the check step 124 is negative, then in step 126 a check is carried out to determine whether the X offset of the point identifier is greater than the Xmax offset of the strip entry information. This check serves as the basis for the next step (step 128) in determining whether to change the sequence number of the key. In effect, this check serves to determine whether the point may lie in another strip having the same size and same Ymin as the strip corresponding to the matching strip entry key, but where the other strip may have different Xmin and Xmax boundaries. If the X offset of the point identifier is less than the Xmax offset of the strip entry information, then the check is negative. In other words, if the X offset is less than the Xmax offset, then the point is not encompassed by another strip having the same size and Ymin but having different Xmin and Xmax boundaries. If the check step 126 is negative, then the method proceeds with respect to N/2 size strips by returning to step 11.

If the X offset of the point identifier is greater than the Xmax offset of the strip entry information, then the check is positive. In other words, if the X offset is greater than the Xmax offset, then this leaves open the possibility that the point may be encompassed by another strip having the same size and Ymin as the strip corresponding to the matching strip entry key. But this other strip may have different Xmin and Xmax boundaries. To facilitate finding this other strip, a check is made in step 128 to determine whether the sequence number of the key is to be changed. Preferably, the sequence number is changed unless a determination has been made that no strips of the appropriate size exist. If the result of the check in step 128 is negative, then the method proceeds to step 114 to determine whether checking is to continue as discussed above in connection with step 114. For example, strips of the next smaller size may be checked for a potentially encompassing strip. If the result of the check in step 128 is positive, then the method proceeds to step 130 to change the sequence number in the key as appropriate. After the change in the sequence number, the method returns to the appropriate checking step so as to continue to check strips of the same size as the potentially encompassing strip that had been found. For example, this return to the appropriate checking is illustrated in FIG. 5 as step 132 wherein a decision is to be made as to which size strips to check. For example, if size N strips are to be checked, then the method returns to step 108, etc. to repeat the process with respect to checking whether the point is potentially encompassed by a strip of N size, etc.

C. Summary of Preferred Operation

The preferred operation of the present invention may be summarized by reference to the steps of FIG. 4–5. In response to receipt of a communication (step 72), the calling number is translated into a point identifier (step 74), and the point identifier is used to create a key (step 76). The key is used with the strip table to look for a strip entry that corresponds to a strip that potentially encompasses the point (step 78). In particular, the key is used to narrow the search to entries of a particular block (step 100). Optionally, the key may be used to check whether the encompassing strip entry corresponds to a strip that encompasses the particular block (steps 102–104). If the point is located in a strip that encompasses the entire block, then the method proceeds to retrieve the desired information (steps 82–84) and to end (step 86). Otherwise, a key is used to check whether the point is potentially located in a strip of size N in the particular block (steps 106–108). If the point is potentially located in an N strip, then steps are taken to obtain strip entry information as is described below (steps 120, et seq.) If the key is not located in a strip of size N, then the key is changed and used to check whether the point is located in a strip of size N/2 in the particular block (steps 110–112) that is located in one or the other halves of the particular block. If the point is not located in a strip of size N/2, then the key may be changed so as to check strips that are of size N/4. If the encompassing strip continues to be elusive, then the key again may be changed so as to check strips that are of size N/8, etc. until an encompassing strip is found or it is determined that the information be obtained from another source (steps, 114–116).

On the other hand, if the point is determined to be in a potentially encompassing strip, then further confirmation of this determination may be made by obtaining the strip entry information that is associated with the strip entry that corresponds to the potentially encompassing strip (step 120). The X offset of the point identifier is compared to the strip entry information to determine whether the X offset is between the Xmin offset and Xmax offset of the strip entry information (steps 120, 122 and 124). If the X offset of the point identifier is between the Xmin offset and Xmax offset of the strip entry information, then the method proceeds to retrieve the desired information (steps 82–84) and to end (step 86). If the X offset of the point identifier is not between the Xmin offset and Xmax offset of the strip entry information, then a check is made to determine whether the X offset is greater than the Xmax offset (step 126). If the X offset is not greater than the Xmax offset, then the method proceeds to check the next size. On the other hand, if the X offset is greater than the Xmax offset, a change may be made in the sequence number of the key (steps 128–130). After this change, then the steps of using a key with the strip entries of the strip table may be repeated (steps 110, et seq.). If the sequence number in the key is not changed, then the method checks whether it is to continue checking (step 114). If not, the method returns to step 80.

By this method as illustrated in FIGS. 4 and 5, the exemplary system checks first for call routing information in the most likely places, i.e., the largest strips, then checks next for call routing information in the next most likely places, i.e., the next largest strips, etc. By checking in the likeliest places first, the exemplary system obtains call routing information more quickly than other systems. Moreover, the exemplary system reduces the amount of information that must be checked on each iteration by employing a binary/hash searching technique.

VI. Conclusion

In sum, the methods and systems of the present invention expedite the processing of a communication with respect to a telecommunications service such as an area number service so that the communication may be more quickly routed to its ultimate destination. Even though the present invention is presented in the context of a telecommunications service, it will be appreciated that the present invention offers advantages to other types of uses. For example, the present invention may be put to use in any type of call or data processing system that requires the retrieval of information prior to the connection or termination of a communication or throughput of the data. In addition, the present invention includes advantages that may be put to use in connection with any type of information retrieval system that requires the retrieval of information from a database that contains a large amount of data. Other areas wherein the present invention also may be used will occur to those skilled in the art.

From the foregoing description, other embodiments of the present invention will suggest themselves to those skilled in the art. Therefore, the scope of the present invention is to be limited only by the claims below and equivalents thereof.

We claim:

1. With respect to a service area, a method for obtaining information relating to a calling number and the information being based on a subscriber area defined within the service area, the method comprising the steps of:

A. providing a grid/block/strip system with respect to the service area by
      1. providing a grid representing the service area with the grid comprising a plurality of blocks, 2. defining the subscriber area within the service area,
3. defining at least one strip within the subscriber area and within a block of the plurality of blocks,
4. providing a strip table with a strip entry corresponding respectively to each strip, and
5. providing that each strip entry be associated with strip entry information;

B. identifying a calling number with the calling number representing a point within the service area;

C. creating a key with respect to the point with the key identifying a particular block encompassing the point;

D. finding an encompassing strip, the encompassing strip being defined within the particular block that encompasses the point, the encompassing strip having an encompassing strip entry in the strip table, and the encompassing strip entry being associated with encompassing strip entry information, the finding of the encompassing strip comprising the sub-steps of:
1. using the key with the strip table to look for the encompassing strip by checking only particular strip entries, the particular strip entries corresponding respectively to strips within the particular block,
2. using the key with the strip table to find the encompassing strip by making a check of the particular strip entries to determine that the point is located in an N-strip in the particular block, the N-strip being a strip of size N, and
3. defining the N-strip in the particular block to be the encompassing strip; and E. based on finding the encompassing strip, obtaining information from the encompassing strip entry information.

2. The method of claim 1, wherein the key of Step C comprises a first key; and wherein the check in Step D, sub-step 2 comprises a first check;

wherein Step D, sub-step 2 further comprises, making a determination that the first check is negative in that the point is not located in an N-strip in the particular block, and then using a second key to make a second check to determine that the point is located in an N/2 strip in the particular block, the N/2 strip being a strip of size N/2; and wherein Step D, sub-step 3 comprises defining the N/2 strip rather than the N-strip to be the encompassing strip.

3. The method of claim 1, wherein each of the strip entries of the strip table include a strip entry key;

wherein sub-step 1 of Step D comprises using the key with the strip table to look for the encompassing strip by checking only particular strip entry keys associated respectively with the particular strip entries corresponding respectively to the strips within the particular block, whereby the key is used in comparison to only the particular strip entry keys and therefore in comparison to a smaller amount of information than to the particular strip entries.

4. The method of claim 1, wherein the point includes an offset;

wherein the encompassing strip entry information comprises a min offset and a max offset, and wherein Step E comprises, prior to obtaining the information from the encompassing strip entry information, comparing the offset of the point to the min offset and the max offset of the encompassing strip entry information, and only if the offset is between the min offset and the max offset, then obtaining the information from the encompassing strip entry information.

5. In a system serving a service area including a subscriber area and having the service area represented by a grid comprising a plurality of blocks with each block including a block identifier, at least one strip being defined within the subscriber area and within a block of the plurality of blocks, the system further providing a strip table with a strip entry corresponding respectively to each strip, and with each strip entry including a strip entry key (SEK) being associated with strip entry information and the SEK having a SEK block identifier and a SEK size indicator, and each strip entry information including a min offset and a max offset, a method for obtaining information based on a calling number and based on the subscriber area, the method comprising the steps of:

A. identifying a calling number with the calling number representing a point within the service area;

B. creating a key with respect to the point wherein the key comprises a point-block identifier and a size indicator, the point-block identifier representing a particular block encompassing the point and including an offset with respect to the point; and C. using the key with the strip table to determine whether the point is located within a strip defined within the particular block by
1. using the key in a search of a SEK of a strip entry for a matching SEK;
2. in response to finding the matching SEK in the strip table, comparing the offset of the point identifier of the key to the min offset of strip entry information corresponding to the matching SEK,
3. comparing the offset of the point identifier to the max offset of the strip entry information corresponding to the matching SEK, and
4. if the offset is between the min offset and the max offset, determining that the point is located in a matching strip corresponding to the matching SEK; and D. obtaining the information from matching strip entry information corresponding to the matching strip.

6. The method of claim 5, with respect to Step C(1), wherein the size indicator of the key is a first size indicator, and wherein using the key in the search of the SEK of the strip entry fails to find the matching SEK, then changing the first size indicator of the key to a second size indicator of the key, and using the key with the second size indicator in the search of the SEK of the strip entry for the matching SEK.

7. With respect to a service area, a method for obtaining information relating to a communication based on a calling number associated with the communication and based on a subscriber area defined within the service area, the method comprising the steps of:

A. providing a grid/block/strip system with respect to the service area by
1. providing a grid representing the service area with the grid comprising a plurality of blocks,
2. defining the subscriber area within the service area,
3. defining at least one strip within the subscriber area and within a block of the plurality of blocks,
4. providing a strip table with a strip entry corresponding respectively to each strip, and 5. providing that each strip entry be associated with strip entry information;

B. receiving a communication including a calling number with the calling number representing a point within the service area;

C. creating a key with respect to the point with the key identifying a particular block encompassing the point;

D. finding an encompassing strip, the encompassing strip being defined within the particular block that encompasses the point, the encompassing strip having an encompassing strip entry in the strip table, and the encompassing strip entry being associated with encompassing strip entry information, the finding of the encompassing strip comprising the sub-steps of:

1. using the key with the strip table to look for the encompassing strip by checking only particular strip entries, the particular strip entries corresponding respectively to strips within the particular block,
2. using the key with the strip table to make a determination that the point is located in a strip that encompasses the particular block in its entirety, and
3. defining the strip that encompasses the particular block in its entirety to be the encompassing strip; and E. based on finding the encompassing strip, obtaining information relating to the communication from the encompassing strip entry information.

\* \* \* \* \*